United States Patent [19]

Shimizu et al.

[11] Patent Number: 4,638,368
[45] Date of Patent: Jan. 20, 1987

[54] REPRODUCTION APPARATUS

[75] Inventors: Katsuichi Shimizu, Kunitachi; Shunichi Masuda, Tokyo; Toshiaki Yagasaki, Hino; Hisashi Sakamaki, Yokohama, all of Japan

[73] Assignee: Canon Kabushiki Kaisha, Tokyo, Japan

[21] Appl. No.: 653,072

[22] Filed: Sep. 21, 1984

Related U.S. Application Data

[63] Continuation of Ser. No. 278,563, Jun. 29, 1981, abandoned.

[30] Foreign Application Priority Data

Jun. 30, 1980 [JP] Japan ................................ 55-88722
Jun. 30, 1980 [JP] Japan ................................ 55-88723

[51] Int. Cl.$^4$ ............................................. H04N 1/00
[52] U.S. Cl. ................................ 358/256; 358/263; 382/10
[58] Field of Search ............... 358/256, 257, 263, 258; 382/10

[56] References Cited

U.S. PATENT DOCUMENTS

| | | | |
|---|---|---|---|
| 3,472,136 | 10/1969 | Hemphill | 355/40 |
| 3,828,319 | 8/1974 | Owen et al. | 358/256 |
| 3,995,106 | 11/1976 | Wern et al. | 358/263 |
| 4,110,794 | 8/1978 | Lester et al. | 355/40 |
| 4,127,849 | 11/1978 | Okor | 360/51 |
| 4,135,212 | 1/1979 | Pugsley et al. | 358/256 |
| 4,139,838 | 2/1979 | Inose et al. | 340/703 |
| 4,149,145 | 4/1979 | Hartke et al. | 358/263 |
| 4,196,450 | 4/1980 | Miller et al. | 358/256 |
| 4,199,815 | 4/1980 | Kyte et al. | 364/523 |
| 4,204,206 | 5/1980 | Bakula et al. | 340/721 |
| 4,240,119 | 12/1980 | Norton et al. | |
| 4,264,808 | 4/1981 | Owens et al. | |
| 4,290,062 | 9/1981 | Marti et al. | 340/721 |
| 4,291,305 | 9/1981 | Kimura et al. | 358/260 |
| 4,317,136 | 2/1982 | Keyt et al. | 358/256 |
| 4,320,419 | 3/1982 | Cottriall | 358/258 |

Primary Examiner—James J. Groody
Assistant Examiner—Edward L. Coles
Attorney, Agent, or Firm—Fitzpatrick, Cella, Harper & Scinto

[57] ABSTRACT

A reproduction apparatus has a reader for reading an original image by photoelectric conversion and a character generator in which image information from said reader and image information from said character generator are synthesized.

10 Claims, 56 Drawing Figures

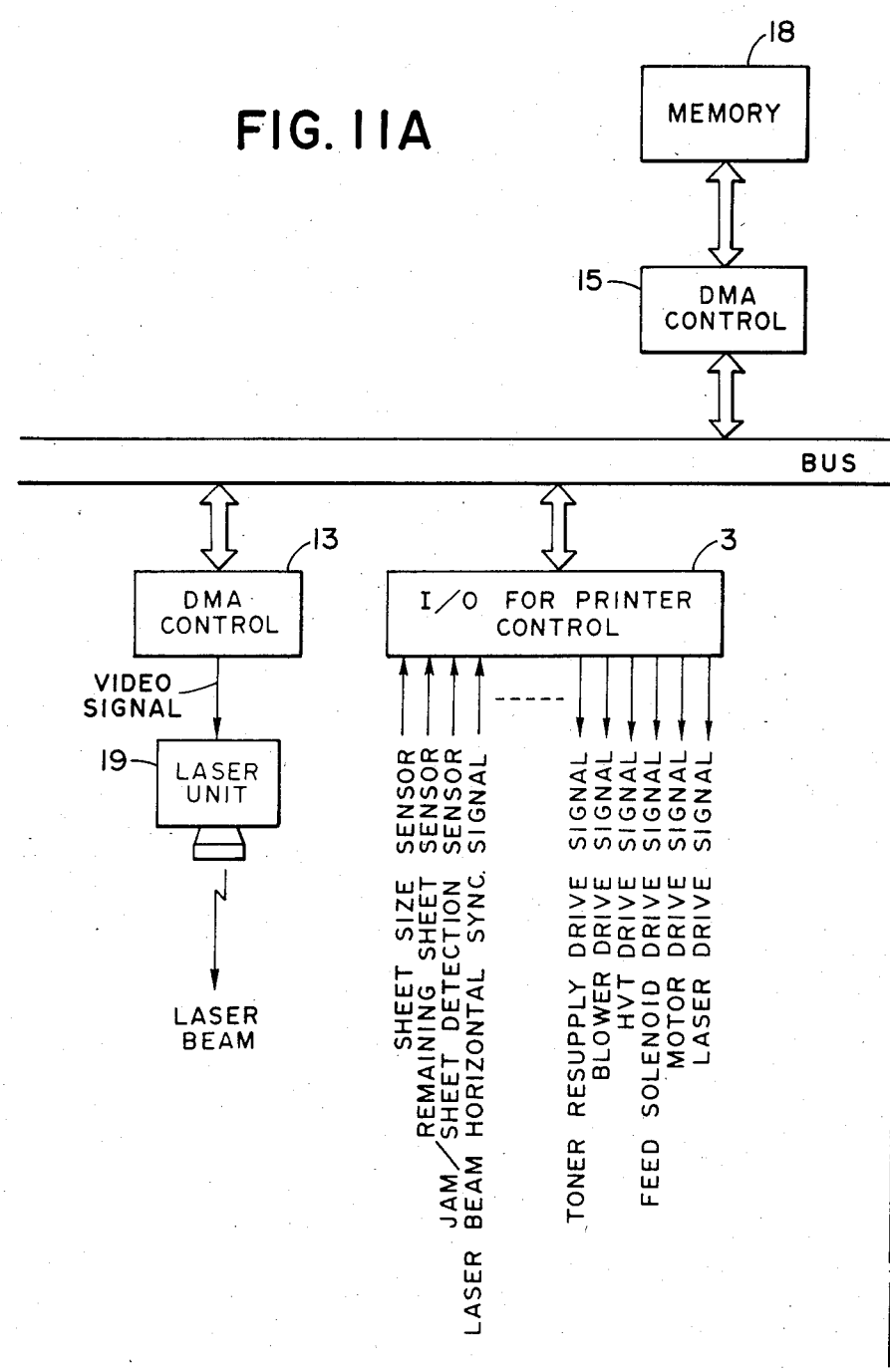

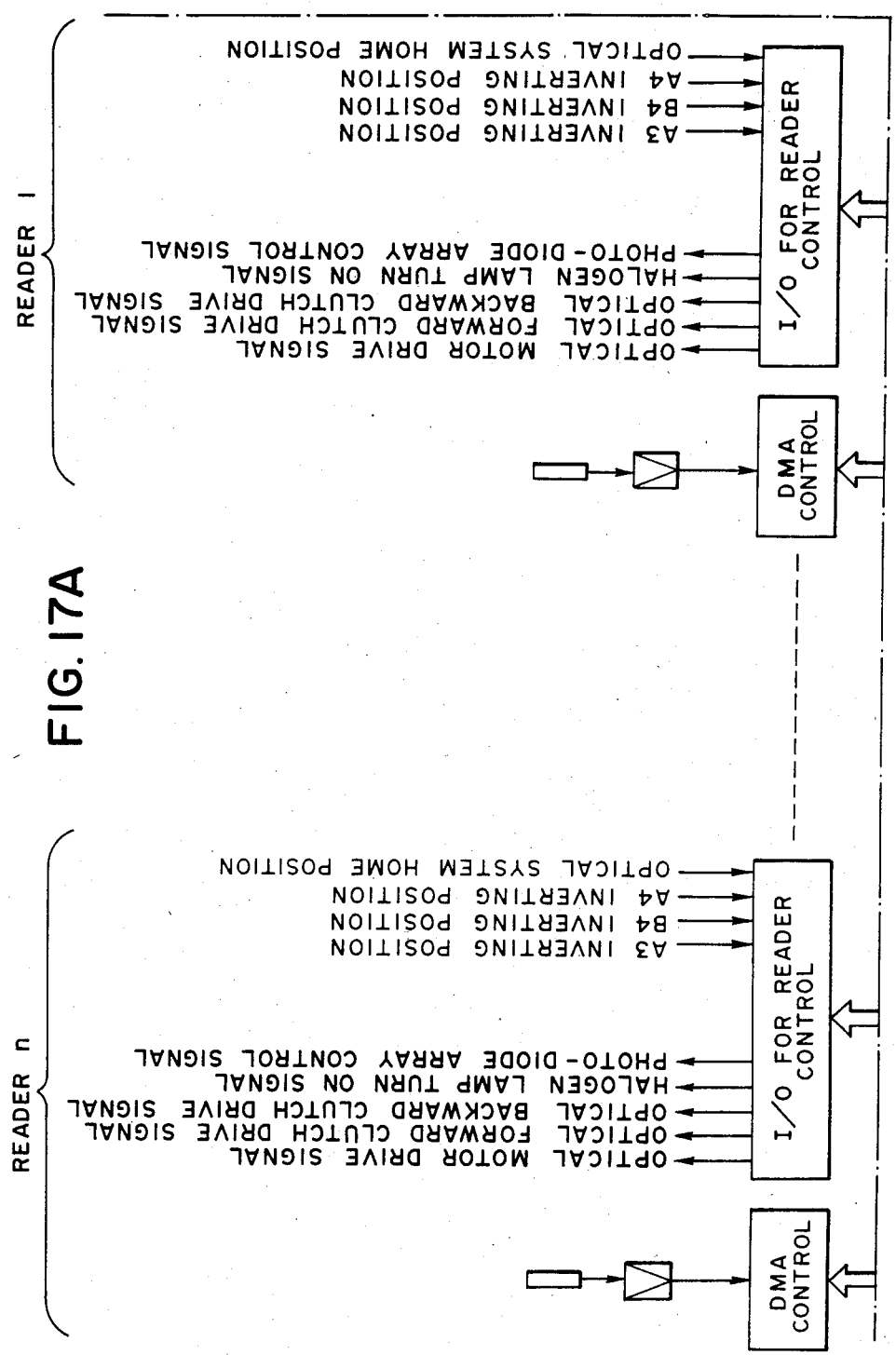

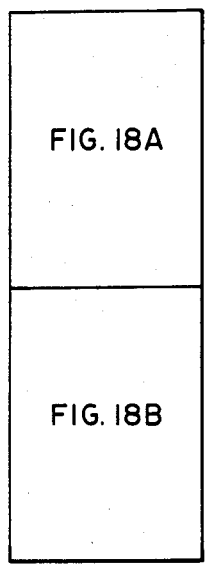
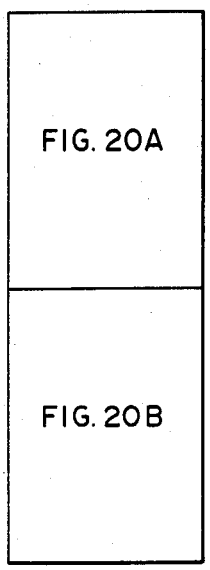
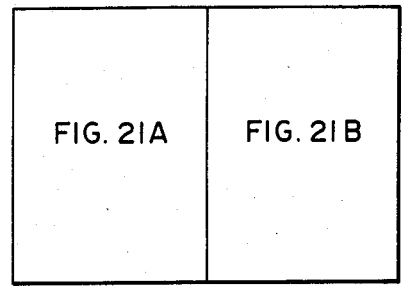
FIG. 18   FIG. 20   FIG. 21
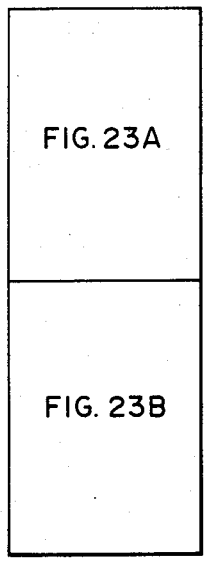
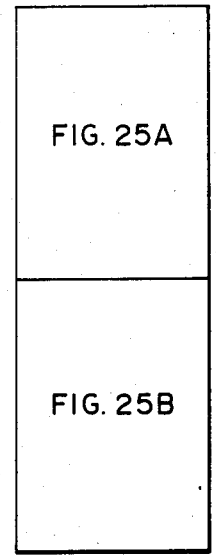
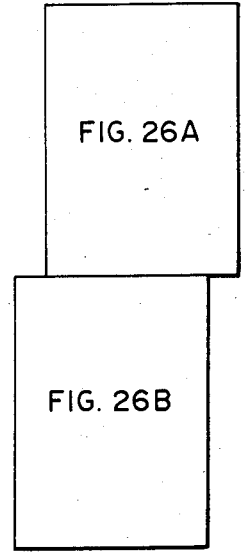
FIG. 23   FIG. 25   FIG. 26

REPRODUCTION APPARATUS

This application is a continuation of application Ser. No. 278,563 filed June 29, 1981, now abandoned.

BACKGROUND OF THE INVENTION

1. Field of the Invention

The present invention relates to a reproduction apparatus for processing image information.

2. Description of the Prior Art

There have been developed and utilized various apparatus for the recording, storage, communication, synthesis, etc., of image information, but such apparatus are mostly designed for a single function and seldom have plural functions integrally combined. Also the visual processing of information as an image improves the efficiency of office work, and there is required an apparatus capable of easily and promptly effecting various processings of image information. Also in the conventional apparatus it has been difficult to insert character information or an image from a keyboard into image information received through a communication line or read from an original.

SUMMARY OF THE INVENTION

In consideration of the foregoing, the object of the present invention is to provide a novel reproduction apparatus.

Another object of the present invention is to provide a reproduction apparatus capable of plural functions for image information processing.

Still another object of the present invention is to provide a reproduction apparatus which permits image processing while visually observing the image information.

Still another object of the present invention is to provide a reproduction machine capable of image information by synthesizing plural information entered from different sources.

Still another object of the present invention is to provide a reproduction machine capable of image information by arbitrary retrieval from the information stored in advance.

The foregoing and still other objects of the present invention will become apparent from the following description to be taken in conjunction with the attached drawings.

BRIEF DESCRIPTION OF THE DRAWINGS

FIGS. 11A and 11B are block diagrams showing the function of the examples and the structure of the control device;

FIGS. 17A, 17B and 17C are block diagrams showing the function of the examples and the structure of the control device;

FIG. 18 illustrates a connecting relationship between FIGS. 18A and 18B.

FIG. 20 illustrates a connecting relationship between FIGS. 20A and 20B.

FIG. 21 illustrates a connecting relationship between FIGS. 21A and 21B.

FIG. 23 illustrates a connecting relationship between FIGS. 23A and 23B.

FIG. 25 illustrates a connecting relationship between FIGS. 25A and 25B; FIG. 26 illustrates a connecting relationship between FIGS. 26A and 26B.

DESCRIPTION OF THE PREFERRED EMBODIMENTS

Figure 1:
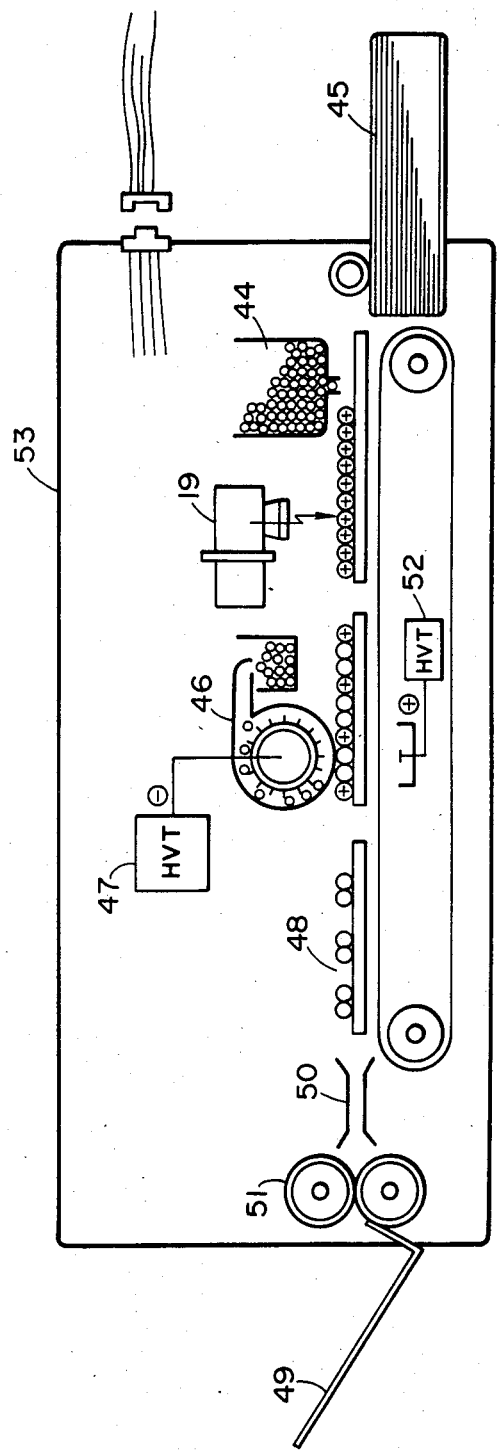
FIGS. 1 and 3 are schematic lateral views showing internal structure of a printer embodying the present invention.

FIG. 1 shows a printer embodying the present invention, wherein 53 indicates a main frame. Copy paper 45 is basically of no particular quality and may be of sheet form stored in a cassette as illustrated or of roll form to be cut after image recording. 44 indicates a developer supply device and developer which constitutes a basic of the present invention and is composed of so-called photoconductive toner. In normal state said toner maintains positive or negative surfacial charge by internal polarization in the toner particles, thus being apparently similar to the magnetic toner. Upon receipt of light, the surfacial charge disappears by the annulment of polarization between said surface charge and the internal opposite charge. The principle of such polarization and the applications thereof are already disclosed for example in the Japanese Patent Laid-open No. sho 53-111733 filed by Ricoh Co., Ltd.

Figure 2:
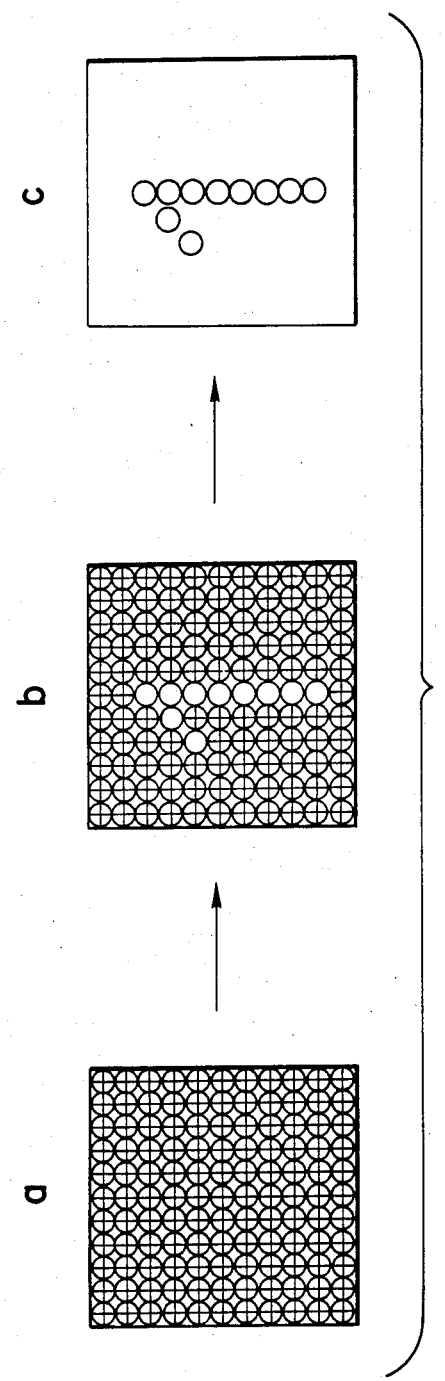
FIG. 2 is an explanatory view showing the principle of character pattern formation.

FIG. 2 shows the principle of character pattern formation by the use of such toner. At first said photoconductive toner is uniformly dispersed over the copy sheet, and a character pattern, corresponding to a dark image area is optically exposed to dissipate the charge in said character pattern. In the succeeding step the still charged toner particles other than in said character pattern are removed by a suction blower simultaneously with an electrostatic charging of the opposite polarity applied to the toner bearing face of the copy sheet. In this step, however, the uncharged toner particles present in said character pattern are partially removed by said suction blower, so that it is necessary to apply charging of same polarity as that of the charged toner thereby facilitating the separation of the charged toner and reinforcing the adhesion of uncharged toner to the copy sheet.

Again referring to FIG. 1, there is also shown a laser device 19 for raster scanning the photoconductive toner uniformly dispersed on the copy sheet as explained in the foregoing with a semiconductor laser to provide character or picture patterns in response to video signals supplied externally; a clearing device and a suction blower 46 for removing the charged toner on the copy sheet by means of a negative charger 47 and a positive charger 52 thereby rendering visible the pattern formed by the scanning of said laser device 19; copy sheet 48 bearing uncharged toner only in said pattern area; a pressure fixing device 51 for fixing the toner remaining on the copy sheet by means of pressure of ca. 30 kg/cm; and a tray 49 for receiving thus fixed copy.

Variation

Figure 3:
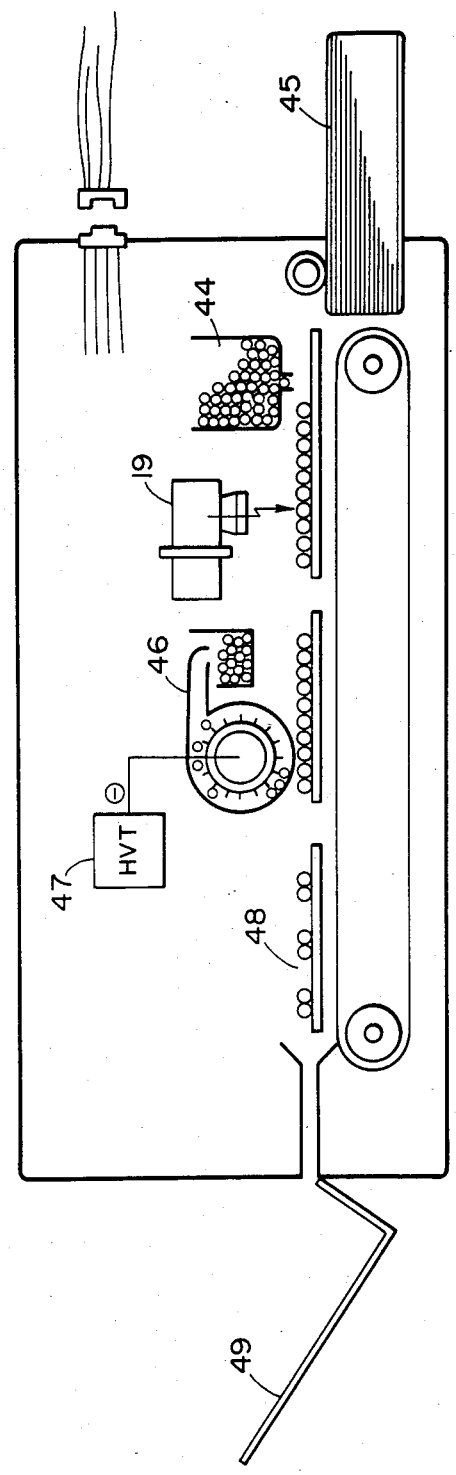

FIG. 3 shows a simplified printer in which the toner particles uniformly dispersed on the copy sheet are selectively fused and simultaneously fixed thereon by the optical energy of a laser beam scanning said copy sheet in response to the video signal supplied externally. There is shown a developing device 44 containing one-component magnetic toner similar to that already known in the art; a carbon dioxide laser device 19 capable of providing high-power output enough for fixing the toner; and a cleaning device 46 composed of a suction blower and a charging device of a polarity opposite to that of the magnetic toner for facilitating the separation of magnetic toner other than the toner forming the pattern already fixed by said laser thereby enabling removal of said unfixed toner by said suction blower and thus providing an already fixed visible image on the copy sheet.

Application

The following is an explanation of an application of the aforementioned printer in the receiver of an information transmission apparatus.

Figure 4:
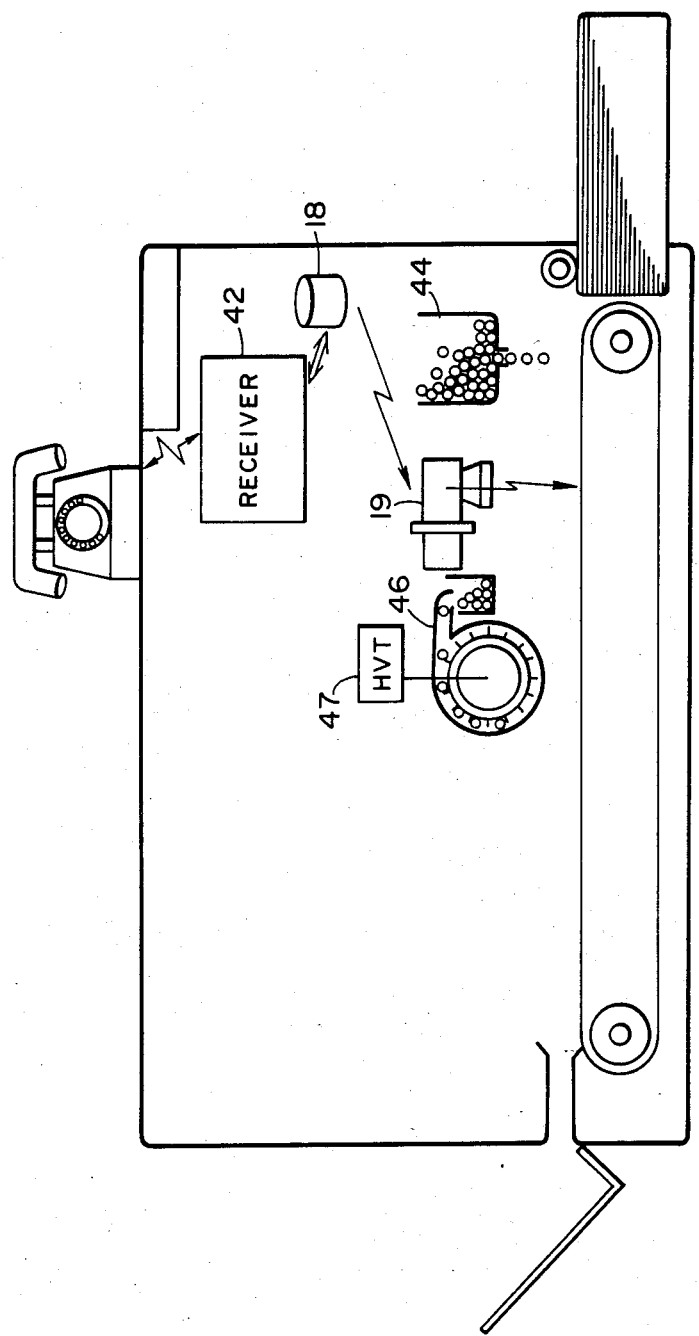
FIGS. 4 and 6 are schematic lateral views showing internal structure of an apparatus in which said printer is applied.
Figure 5:
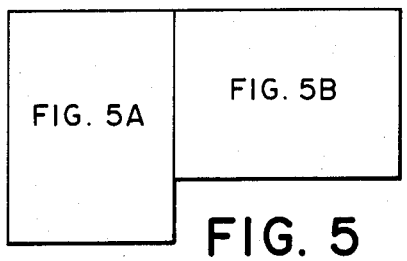
FIG. 5 illustrates a connecting relationship between FIGS. 5A and 5B.
Figure 7:
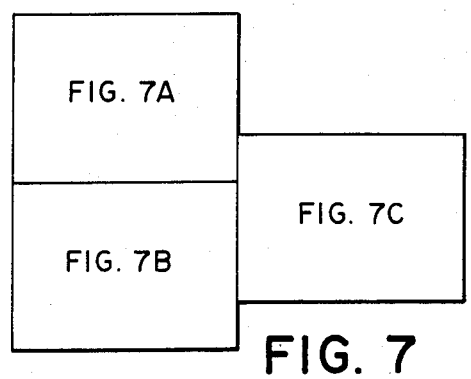
FIG. 7 illustrates a connecting relationship among FIGS. 7A, 7B and 7C.
Figure 9:
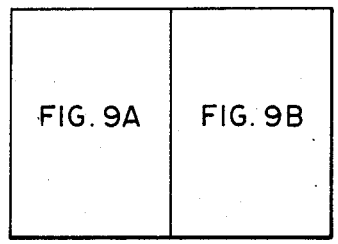
FIG. 9 illustrates a connecting relationship between FIGS. 9A and 9B.

The structure of such apparatus is schematically shown in FIG. 4. The image information transmitted through a telephone line is received by a receiver 42 and temporarily stored in a memory apparatus 18, which may be composed of a fixed-head disk memory or a semiconductor memory. When a suitable amount of information is stored in the memory device 18, the information is released therefrom to the laser device 19 in synchronization with the copy sheet advancing speed of the printer for scanning the copy sheet with the laser beam. The above-mentioned temporary information storage in the memory device 18 instead of direct information supply from the telephone line to the laser device 19 through the receiver 42 is employed in consideration of a fact that the printer of the present invention is capable of achieving a linear copying speed in excess of 100 mm/sec, which, in case of advancing a copy sheet of A4 size along the short edge thereof with a speed of 100 mm/sec, corresponds to a write-in frequency of $1 \div (100 \text{ mm/sec}) \div 2352 \text{ bits} = 4 \text{ f } \mu\text{sec/bit} = 250 \text{ KHz}$, which is approximately 83 times larger than 3 KHz, the maximum information transmission speed is a usual telephone line. The above-mentioned value of 2352 bits is obtained by multiplying the width of a A4 size (294 mm) by the number of pixels per millimeter (8). Also in the present embodiment the transfer of image information in the apparatus and the transfer of operational instructions for controlling the apparatus are conducted through a common bus line as will be explained later, so that the image information is stored in the memory device 18 during the transfer of operational instructions from the central processing unit to the various units in the apparatus. In this manner the memory device 18 in the present application has the functions of matching the transfer speed of telephone line with the printer speed and of shunting the image information from the common bus line. Besides the combination of such a printer and memory device 18 there is an effect of providing an arbitrary number of copies from only one reception of information. Furthermore, it is rendered possible to store the received information for an arbitrary period and to make any desired number of copies therefrom an off-line basis during the unoccupied time of the telephone line.

Figure 5A:
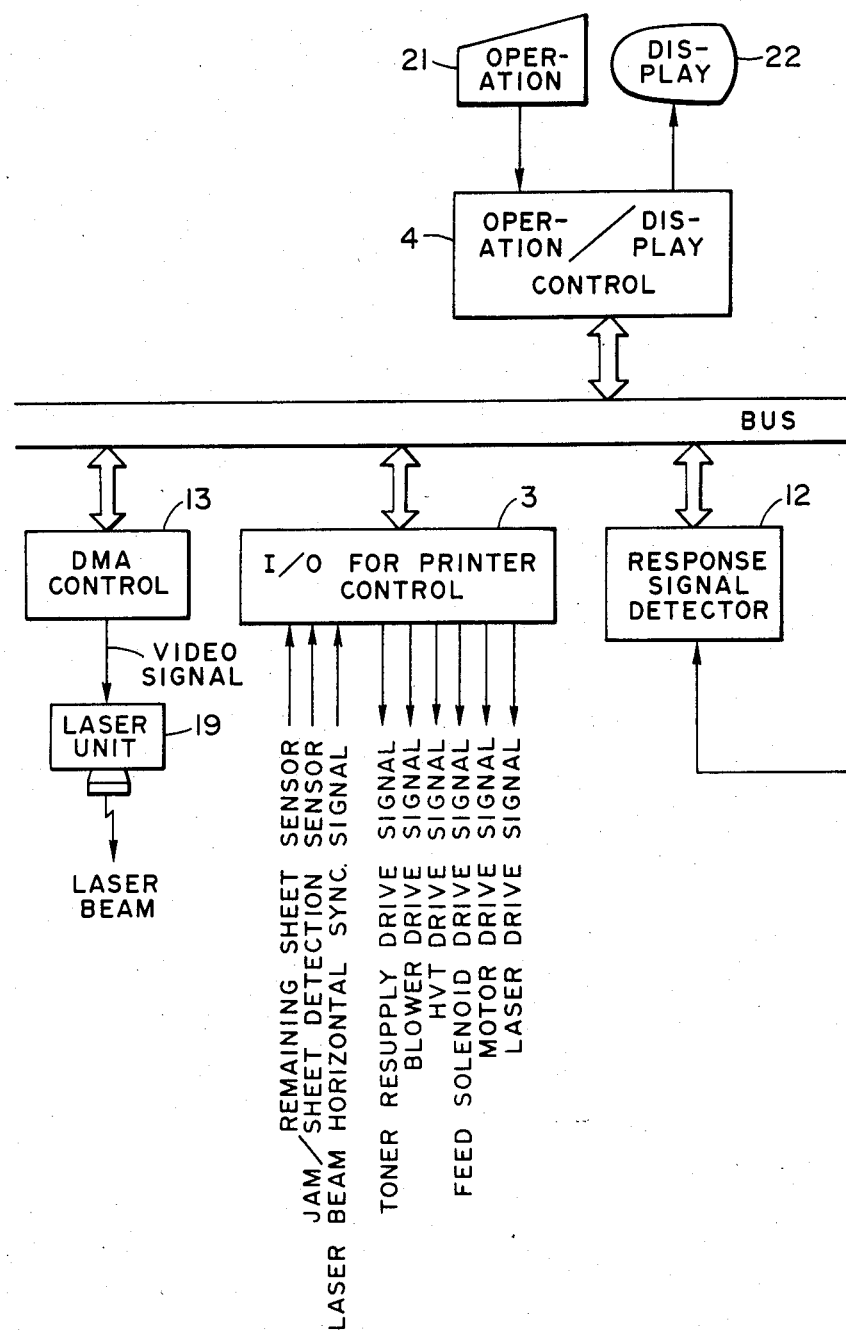
FIGS. 5A and 5B are block diagrams showing the function of the examples and the structure of the control device.
Figure 5B:
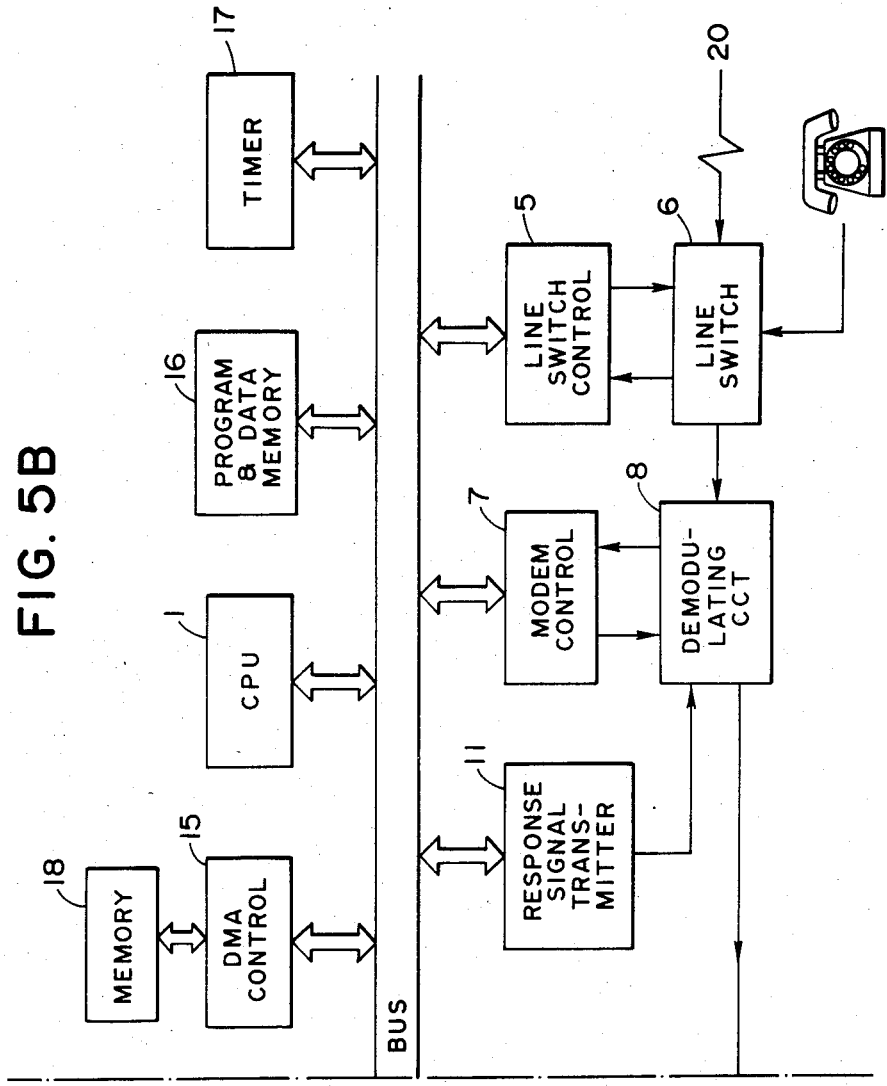
Figure 18A:
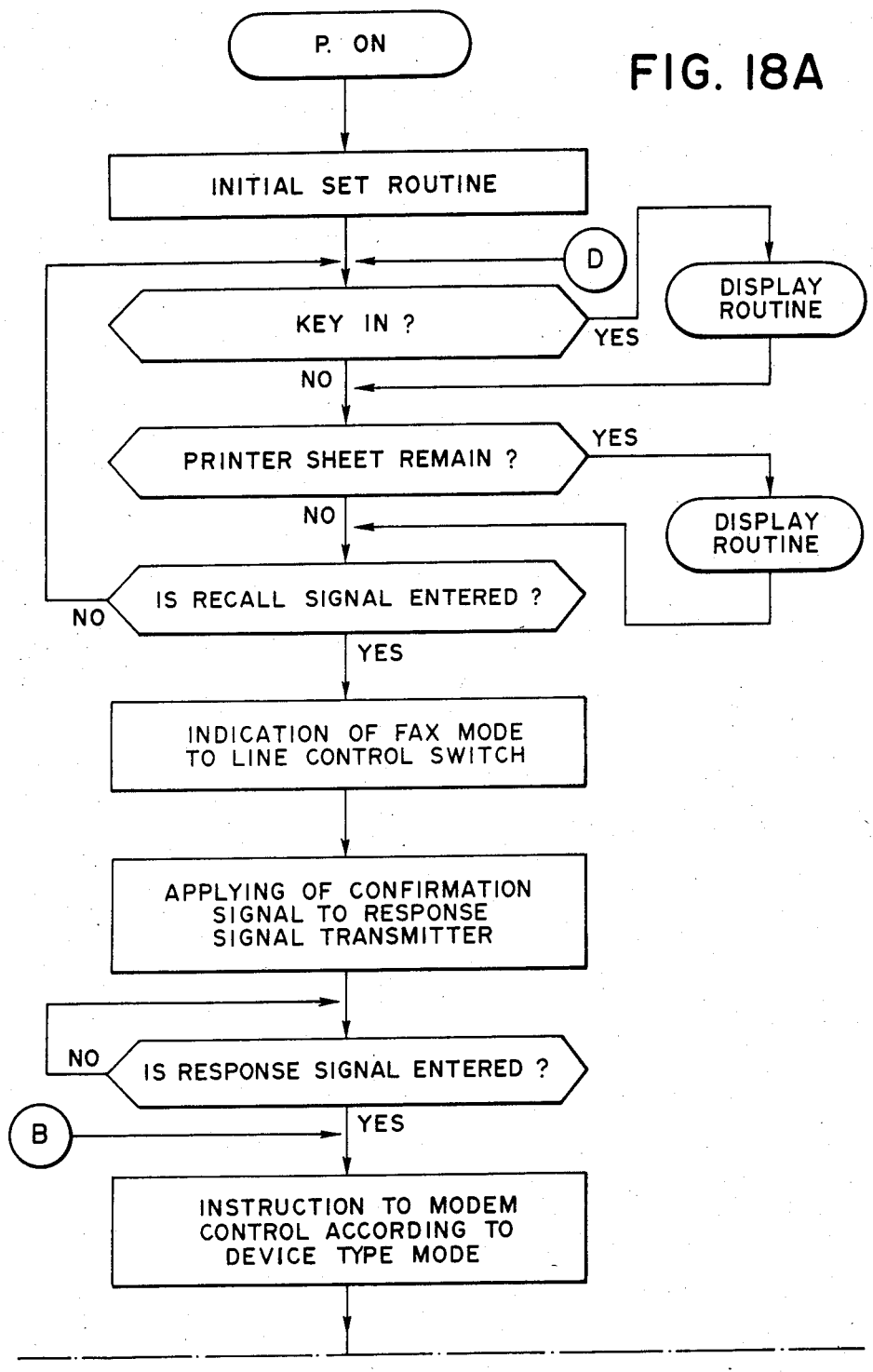
FIGS. 18A and 18B are flow charts showing the control function by the control device of the present invention.
Figure 18B:
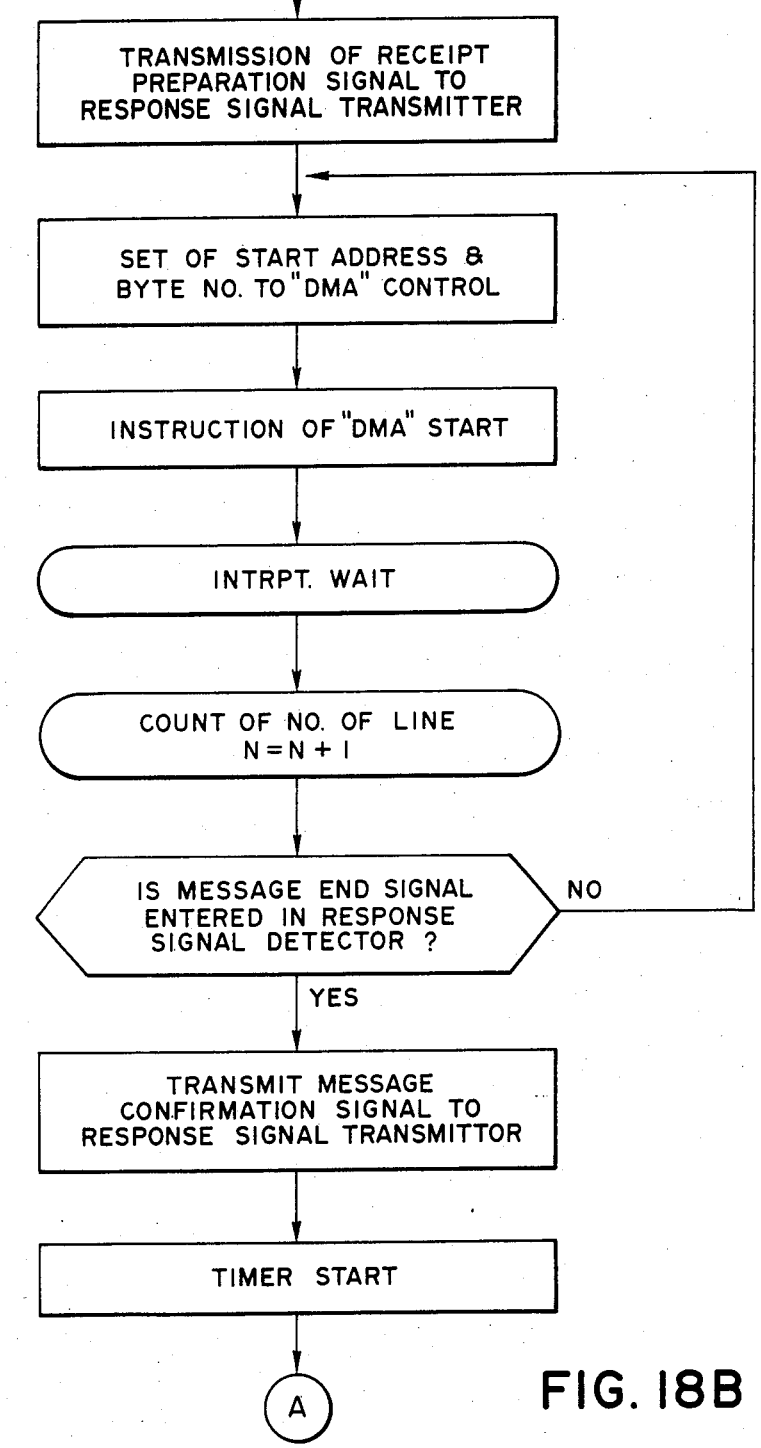
Figure 19:
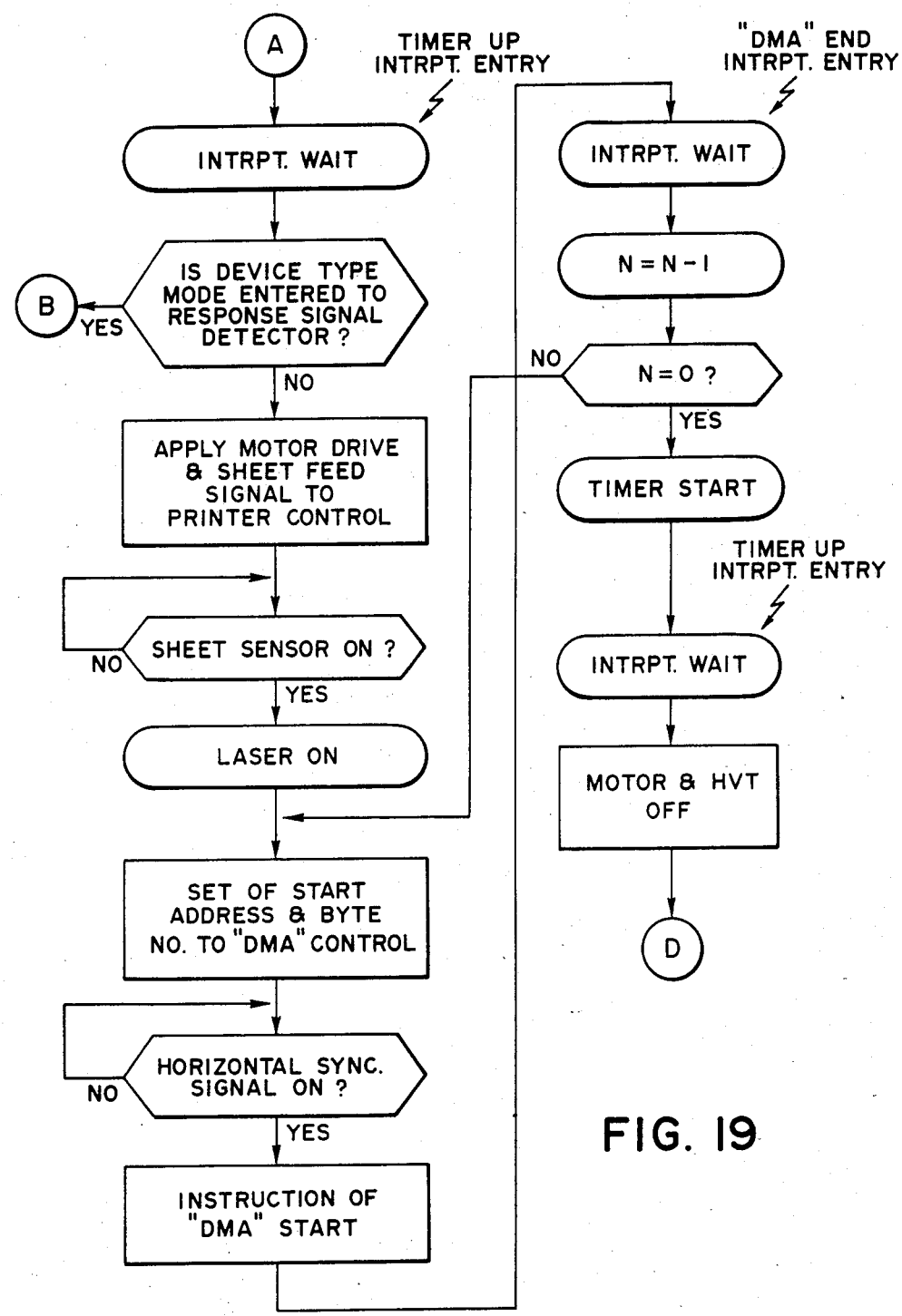
FIG. 19 is flow chart showing the control function by the control device of the present invention.
Figure 20A:
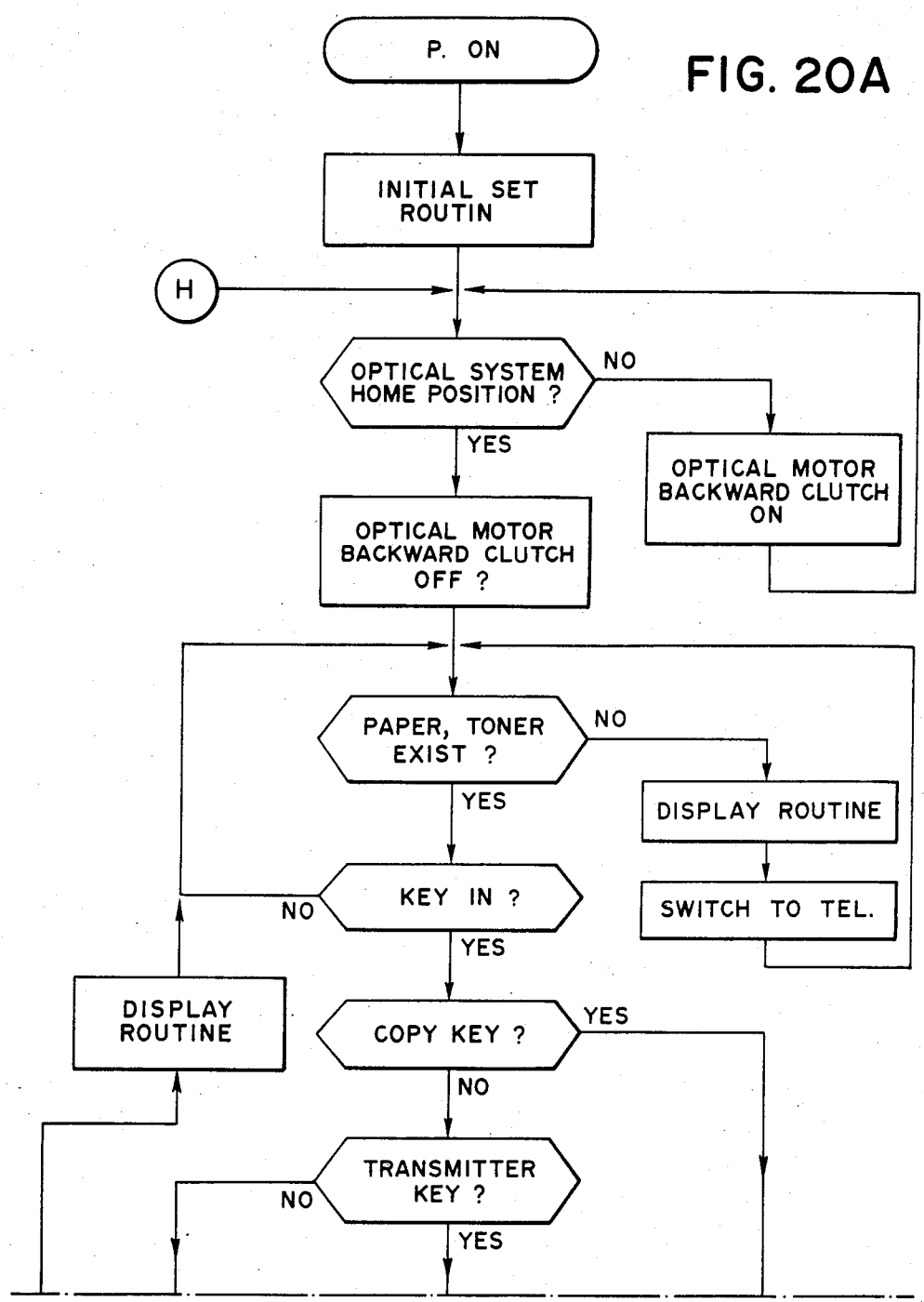
FIGS. 20A and 20B are flow charts showing the control function by the control device of the present invention.
Figure 20B:
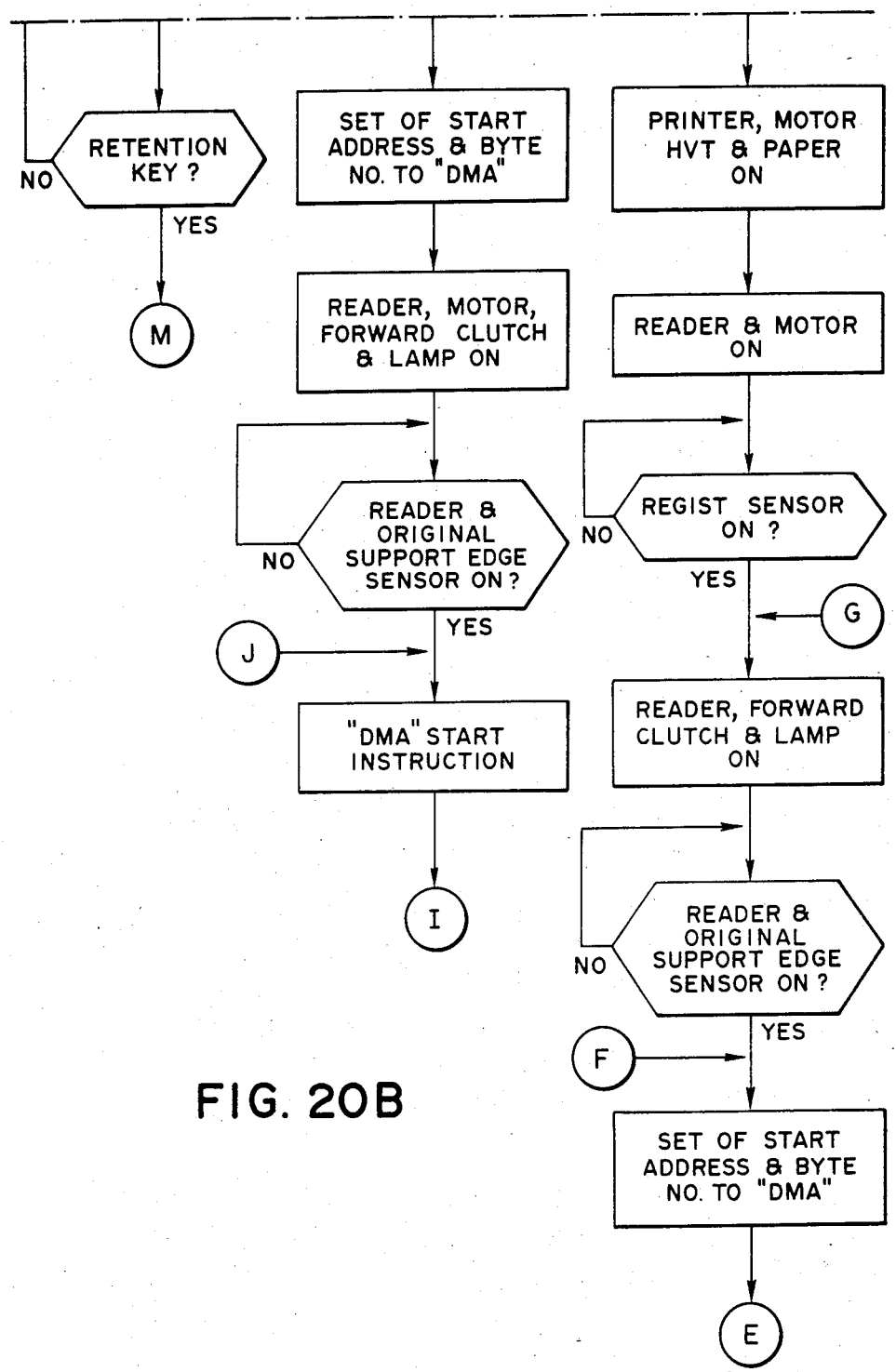
Figure 21A:
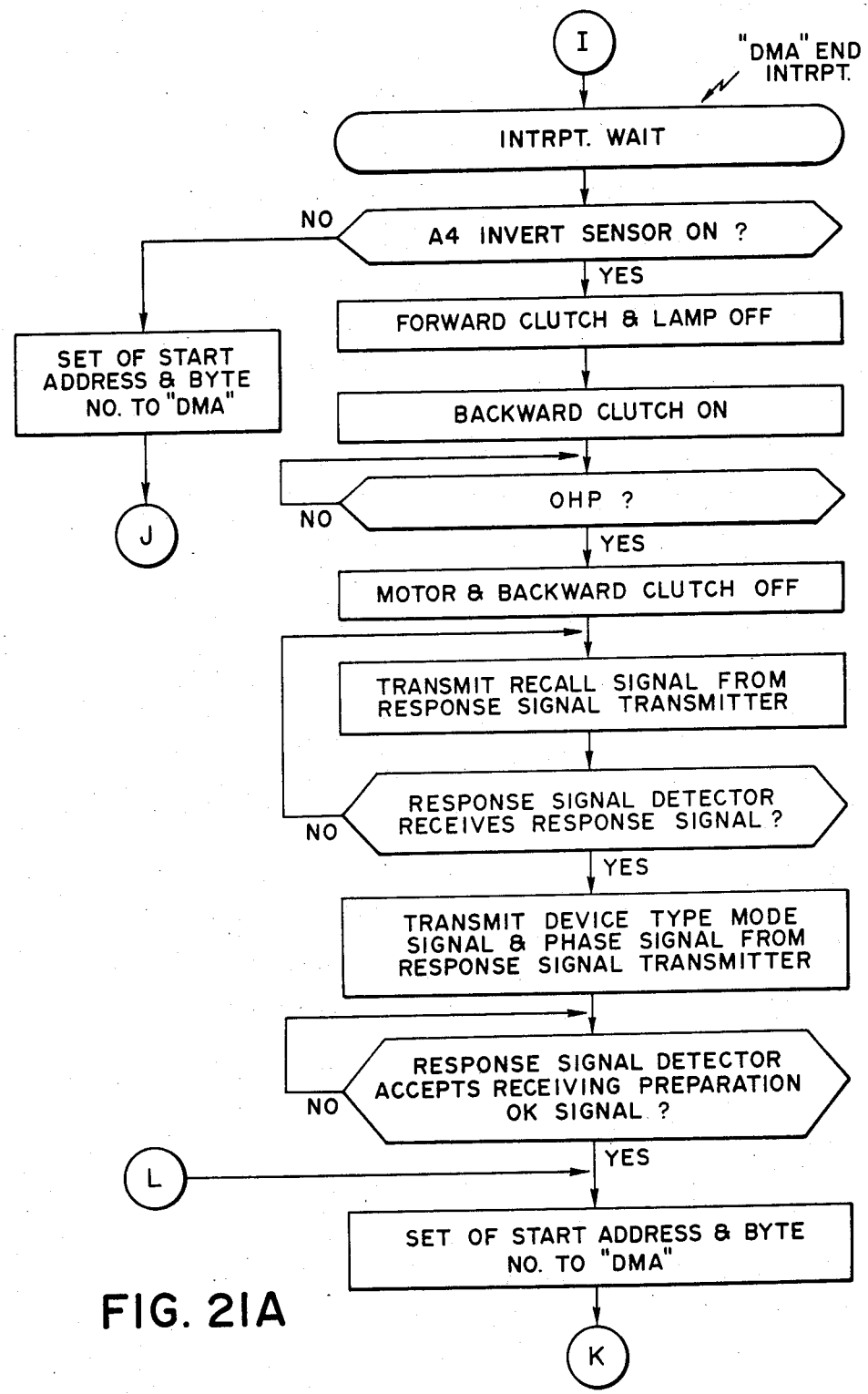
FIGS. 21A and 21B are flow charts showing the control function by the control device of the present invention.
Figure 21B:
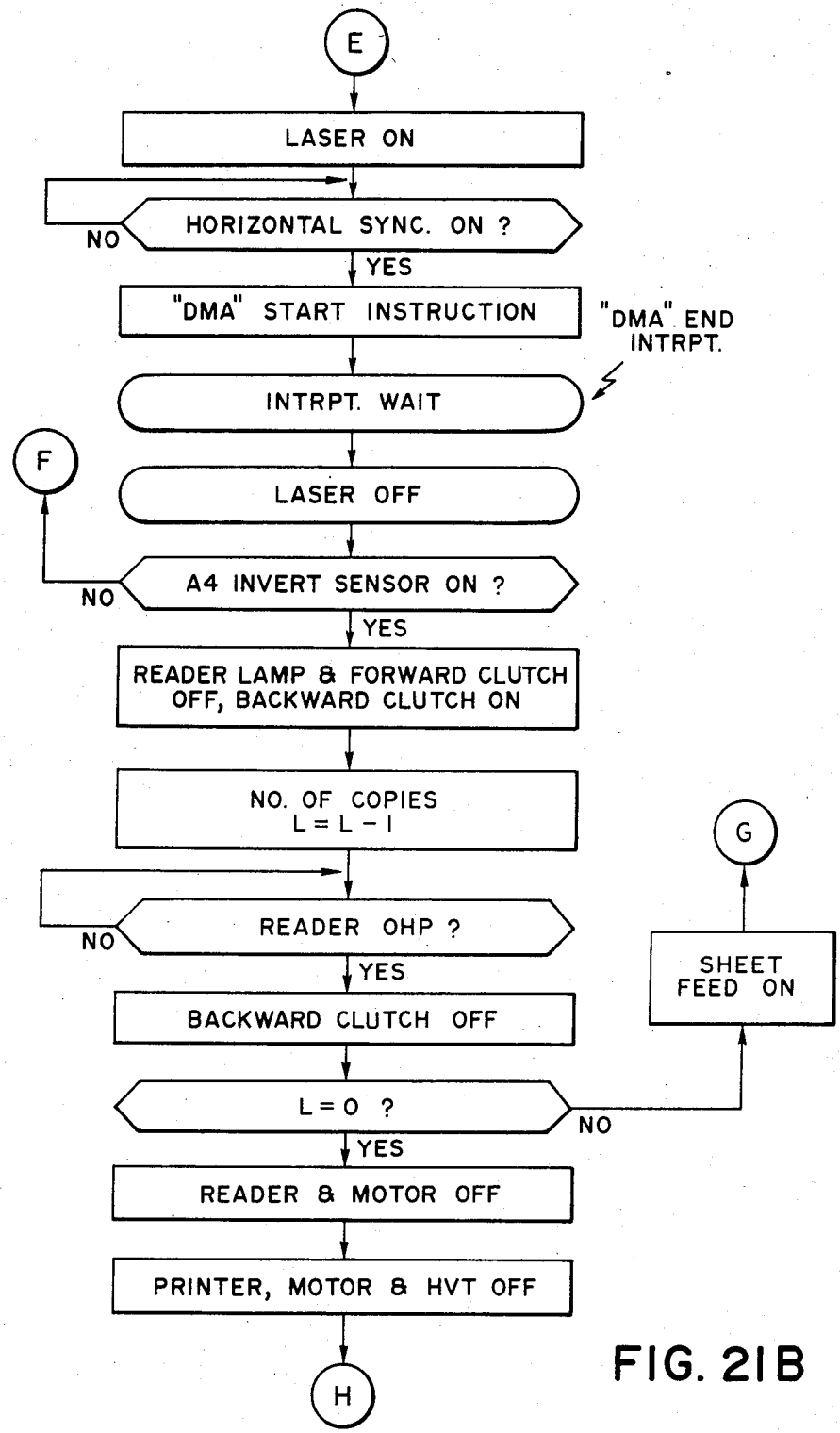
Figure 22:
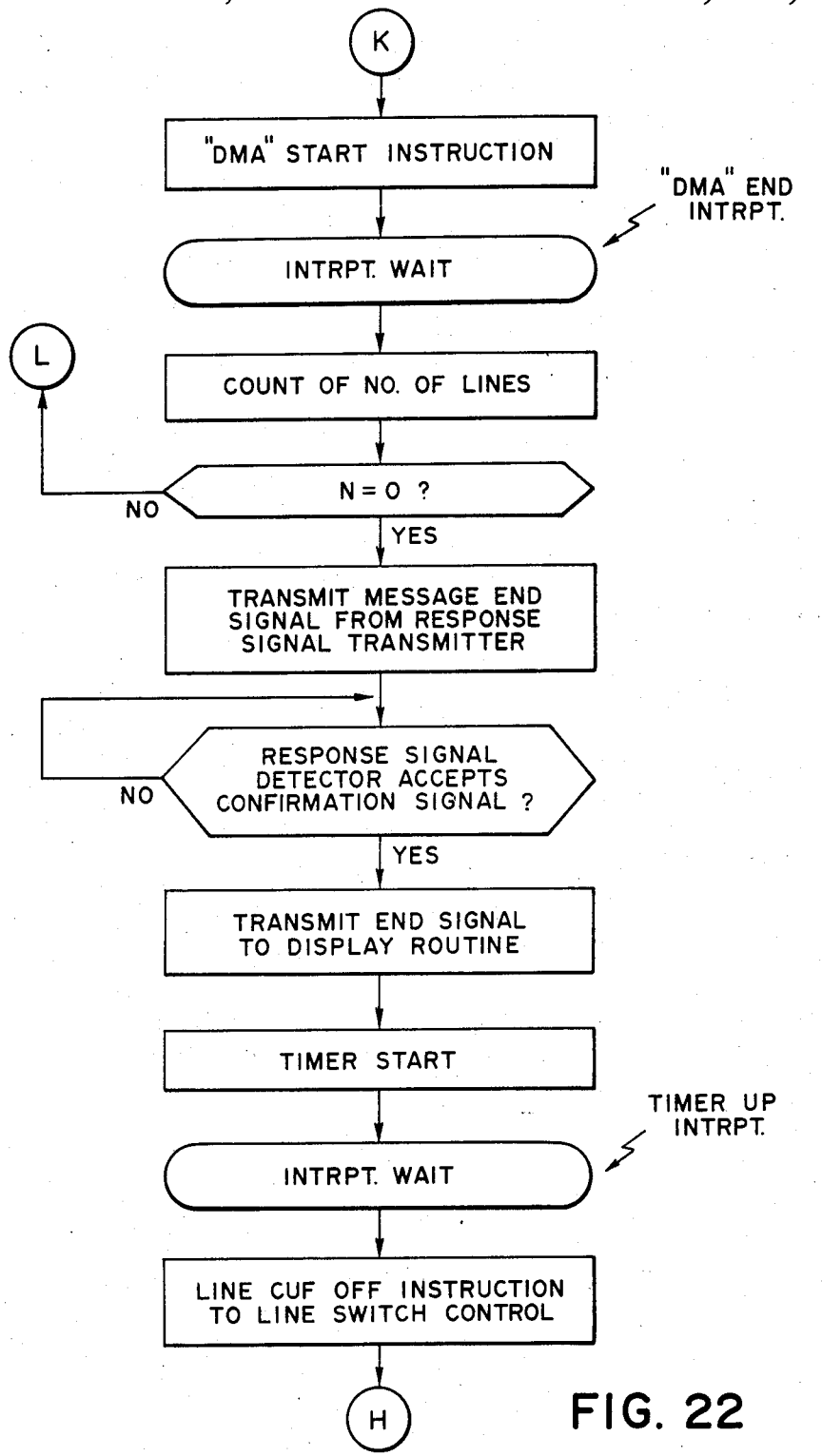
FIG. 22 is flow chart showing the control function by the control device of the present invention.
Figure 23A:
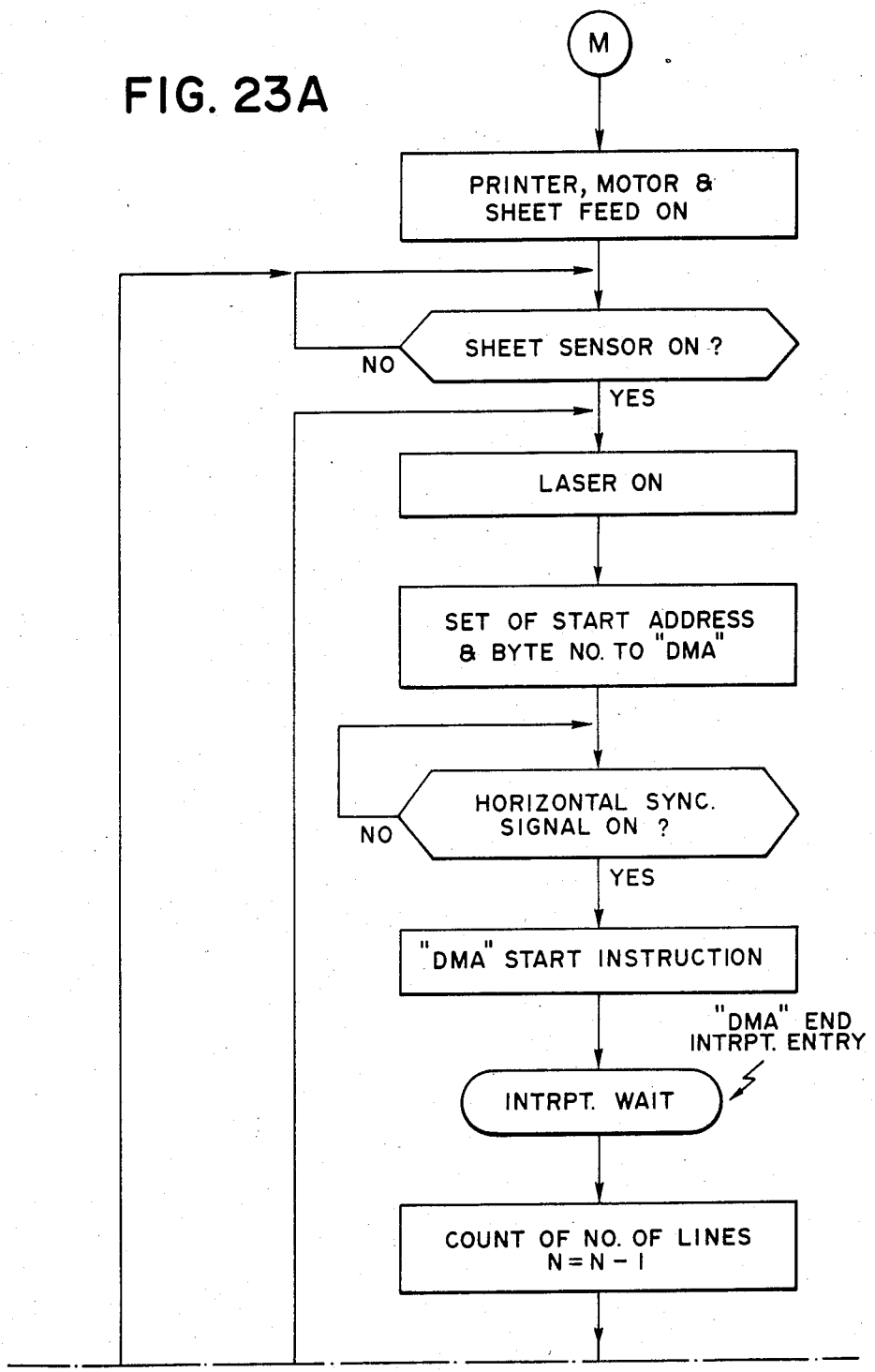
FIGS. 23A and 23B are flow charts showing the control function by the control device of the present invention.
Figure 23B:
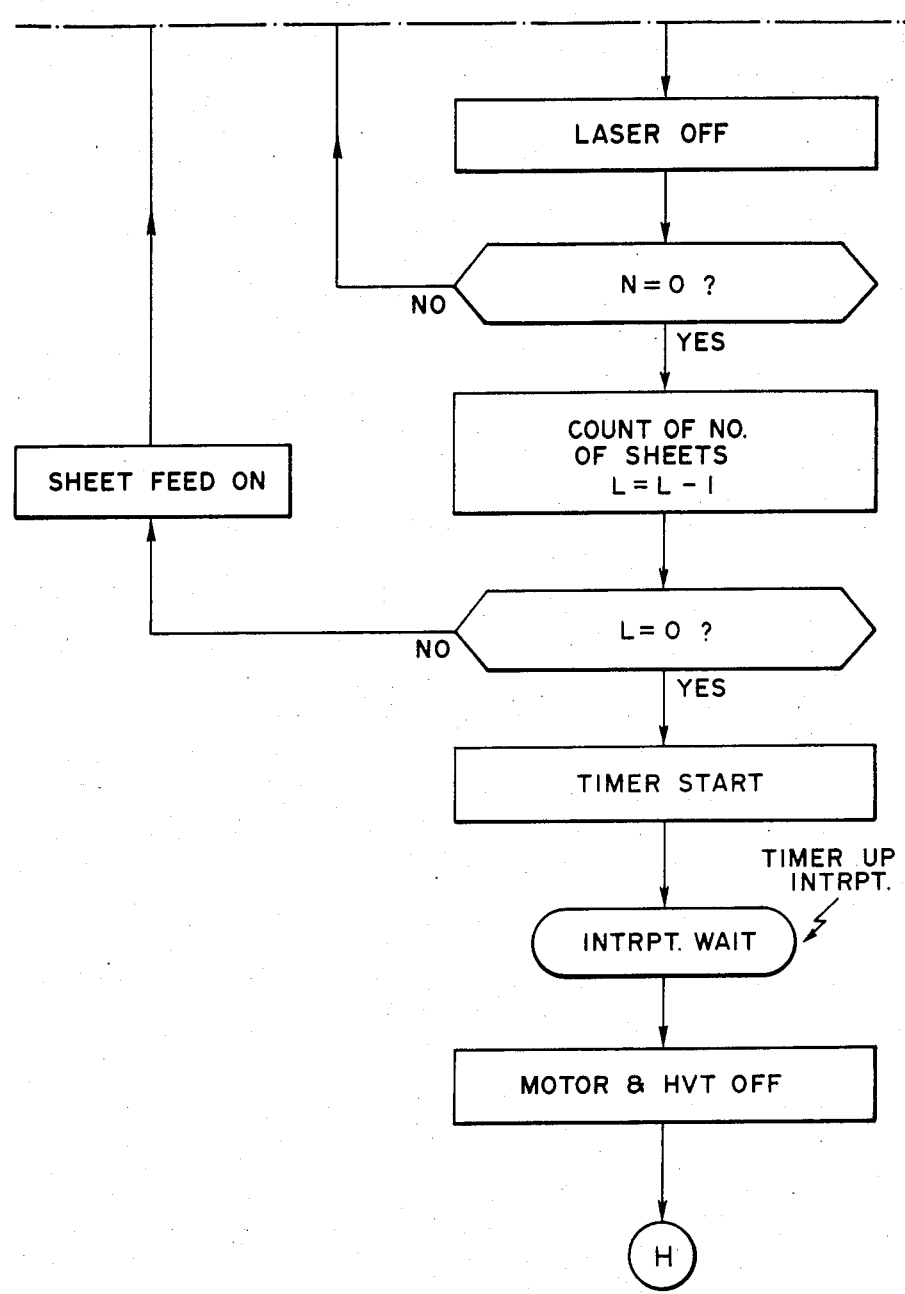

FIGS. 5A and 5B shows the circuit structure of the apparatus shown in FIG. 4, which is principally controlled by a microcomputer or a CPU 1, composed for example of Intel 8086 supplied by Intel Corporation. In the stand-by state, the CPU 1 performs monitoring of signal entry from keys 21 and supplying the key-entered information to a display unit 22 through an operation/-display control unit 4, and monitors the printer function through an input/output interface 3. In case of an abnormality, the CPU 1 supplies a signal to the display unit 22 through the operation/display control 4 to warn the operator. Also the CPU 1 monitors a call signal of 16 Hz from the telephone line through a line switch 6 and a line switch control 5, and, upon reception of said call signal, releases an instruction for facsimile/telephone mode selection to the line switch control 5, which thus maintains the line switch 6 in the facsimile mode. Subsequently the CPU 1 releases a signal conforming the receipt of said call signal to the sender through a response signal transmitter 11, a demodulating circuit 8 and the line switch 6. The CPU 1 senses the subsequent machine mode signal from the sender through the line switch 6, demodulating circuit 8 and a response signal detector 12, and, if phase matching is satisfactory, returns a reception stand-by signal through said response signal transmitter 11, demodulating circuit 8 and line switch 6. The image information of N lines thereafter received is received through the demodulaing circuit 8, MODEM control 7 and DMA control 15 and stored in a memory device 18. Upon detection of a message end signal by the response signal detector 12, the CPU 1 returns a message confirmation signal through the response signal transmitter 11. At this point the CPU 1 starts a timer 17, and instructs the line switch control 5 to disconnect the line if a machine mode signal is received by the response signal detector 12 within a determined time. Subsequently the CPU 1 activates the printer to initiate the advancement of copy sheet, activates the laser upon detection of arrival of the leading end of copy sheet at the optical axis of the laser, and transfers the bus line to DMA controls 13, 15 upon detection of a laser beam horizontal synchronization signal. In this manner the image information of one line stored in the memory device 18 is released in succession to the laser 19 through the DMA controls 15 and 13. After the completion of said signal release of one line, the above-explained procedure is repeated in response to the succeeding laser beam horizontal synchronization signal. The image print-out is completed by repeating said procedure for N lines (cf. flow charts in FIGS. 18 and 19).

In summary, the response signal transmitter 11 and the response signal detector 12 perform response control for confirmation with the sender before and after the image reception, thus achieving pre- and post-process for the image transmission; the MODEM control 7 controls the transmission channel for the image information; and the line switch control 5 performs the selection and maintenance of the facsimile/telephone mode.

Figure 6:
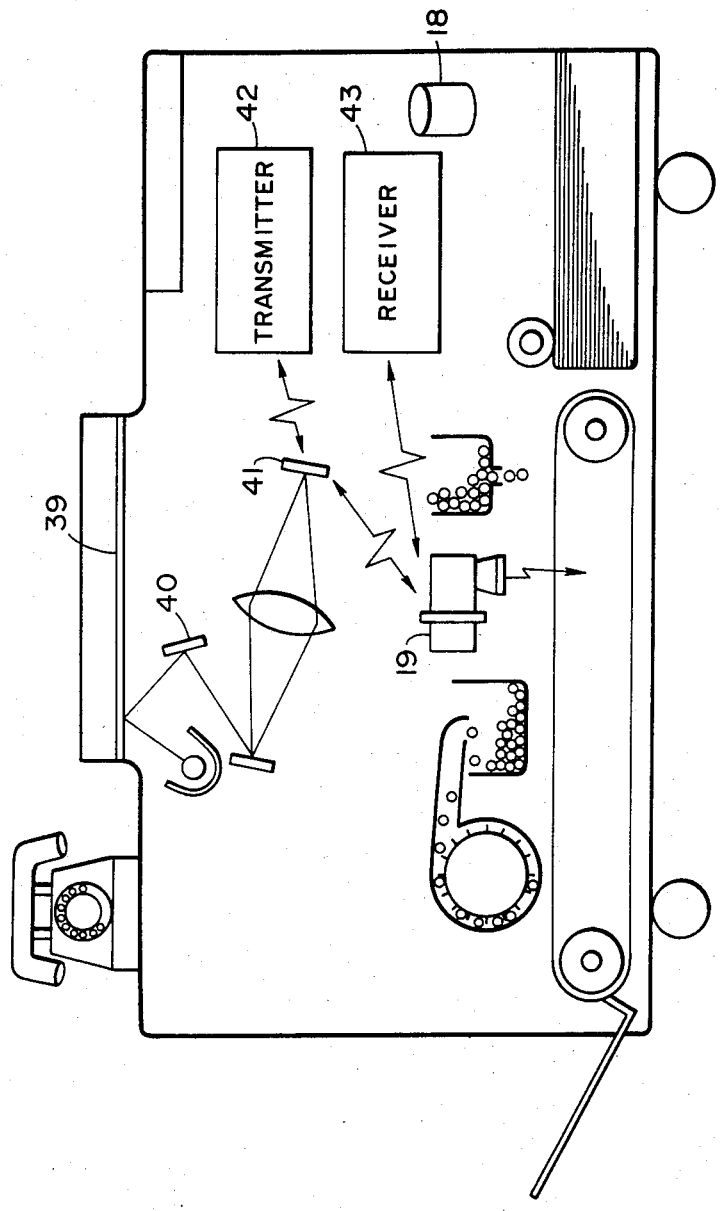

The following is an explanation of another application of the present invention to a copier-information transmitter, of which structure is schemtically shown in FIG. 6.

For the use of said apparatus as an off-line copier, there are provided an original carriage 39, and an optical system 40 composed of a lamp, a reflector, flat mirrors, a lens, a photodiode array, and a scanning mechanism. The image pattern illuminated by said lamp is focused onto the photodiode array 41 through said mirrors and lens. The image pattern is therefore focused in succession on the photodiode array 41 by scanning the original document on the carriage 39 with the optical system 40, released as serial signal from the photodiode array 41 and supplied to the laser device 19 for synchronization with the advancement of the copy sheet to reproduce the original image pattern scanned by said optical system 40 on the copy sheet.

In the transmission mode, the scanning speed of the optical system 40 and the advancing speed of the copy sheet are maintained the same in consideration of the aforementioned copying function. Said speed, being equal to 100 mm/sec as explained in the foregoing embodiment, corresponds to a much higher serial transmission speed than permissible in the telephone line, so that the serial signals are once stored in the memory device 18 and transmitted through the transmitter 42.

In the reception mode the apparatus functions in the sama manner as in the foregoing embodiment as the receiver of information transmitting apparatus, wherein the image signals transmitted through the telephone line are once stored in the memory device 18 and are supplied to the laser device 19 therefrom.

Furthermore, in the transmission and reception modes the memory device 18 is also utilized as a shunt for the electric image signals during the transfer of operational instructions for various units of the apparatus, since a common medium is utilized for the transfer of both the image information and the operational instructions. Also in case of a demand for transfer of urgent image information during the transfer of another image information, it is possible to preferentially transfer said urgent information by shunting said another image information.

Furthermore the temporary storage of the image information in the memory device 18 avoids the necessity of image formation by the laser device 19 simultaneously with the reception of said information, and this fact allows the reception of image information even in the presence of a failure in the image forming unit such as the laser device 19. It is furthermore possible, by the use of a sectioned memory, to store information of several pages and to retrieve a desired page for print-out when required.

Figure 7A:
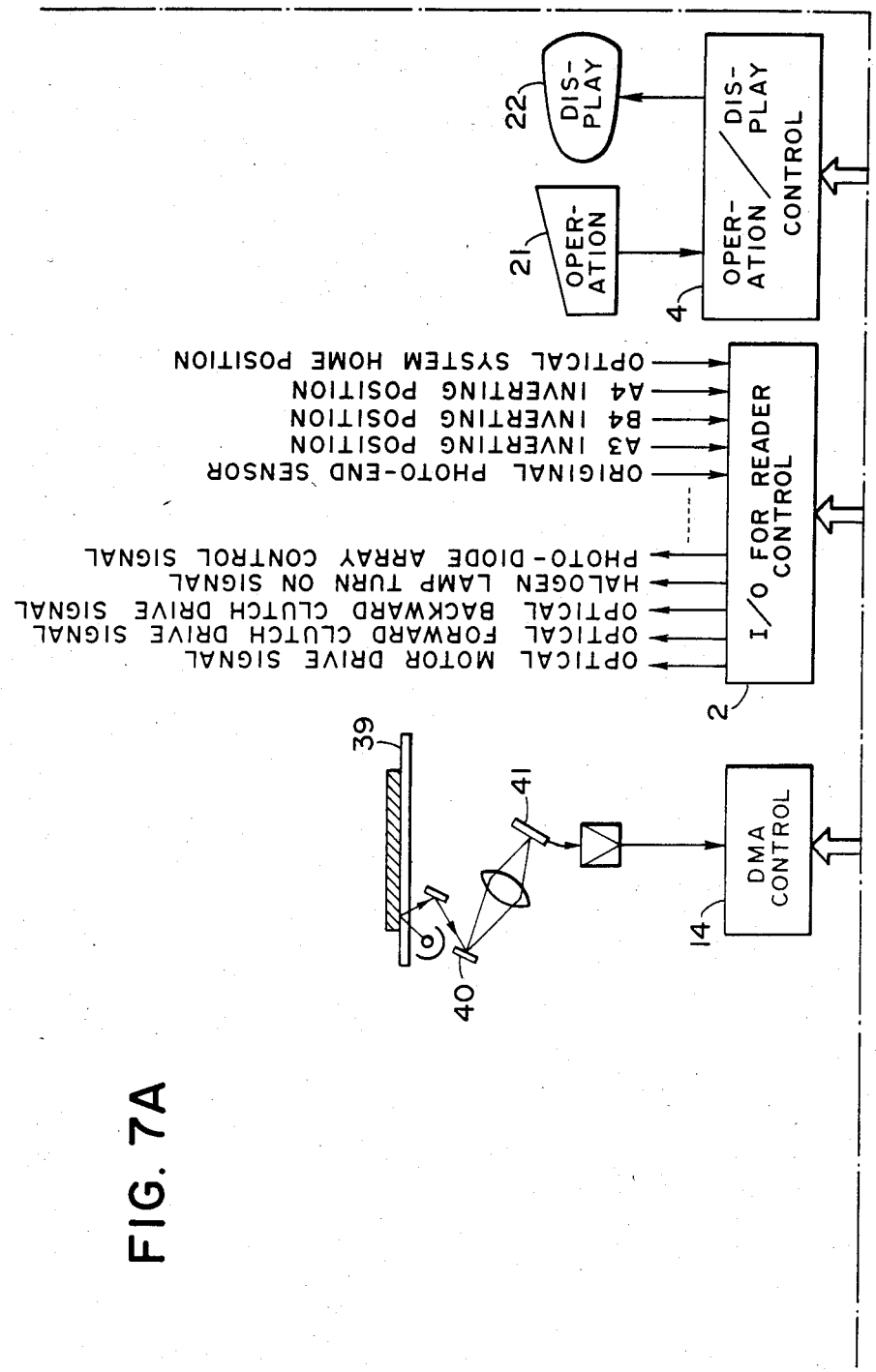
FIGS. 7A, 7B and 7C are block diagrams showing the function of the examples and the structure of the control device.
Figure 7B:
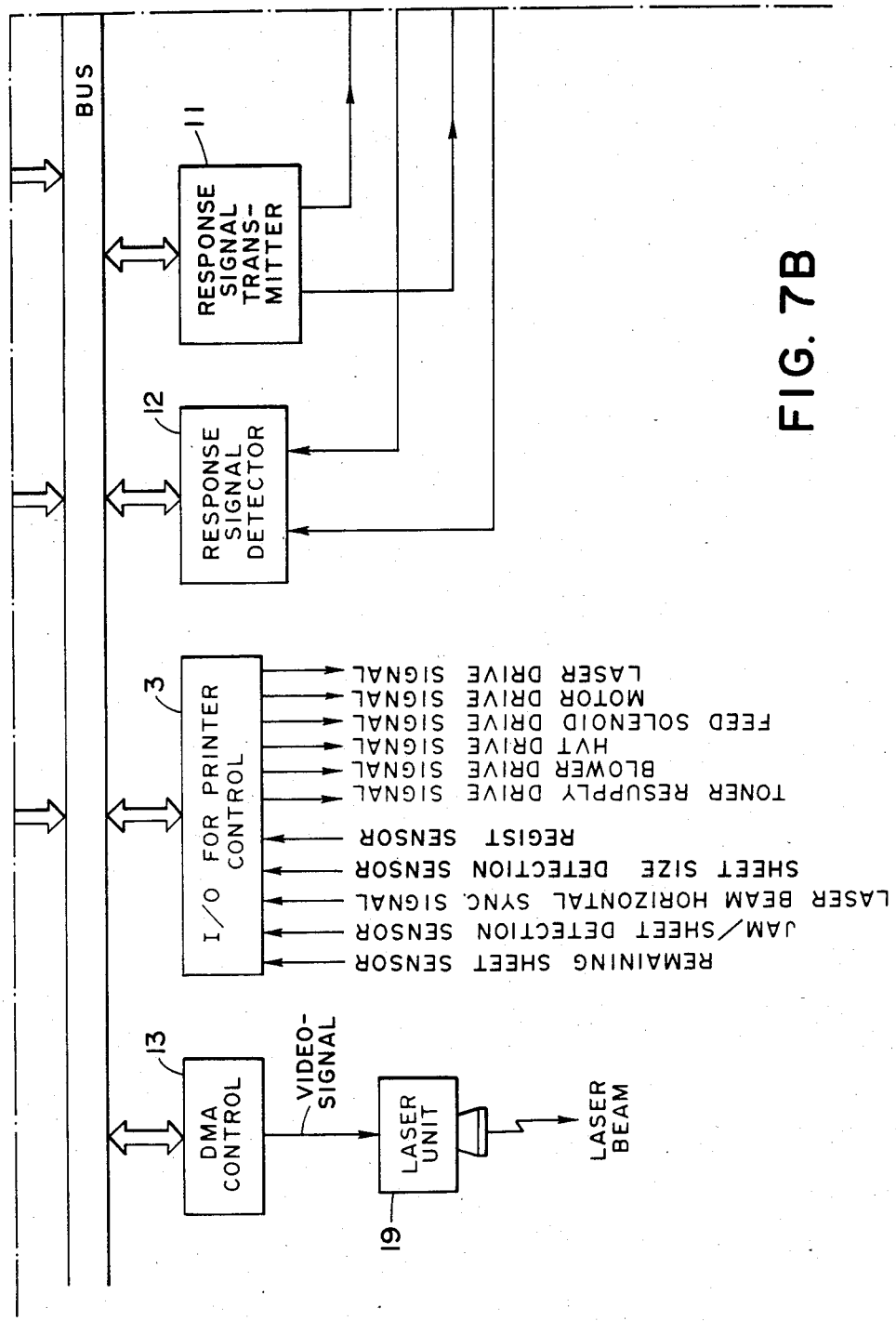
Figure 7C:
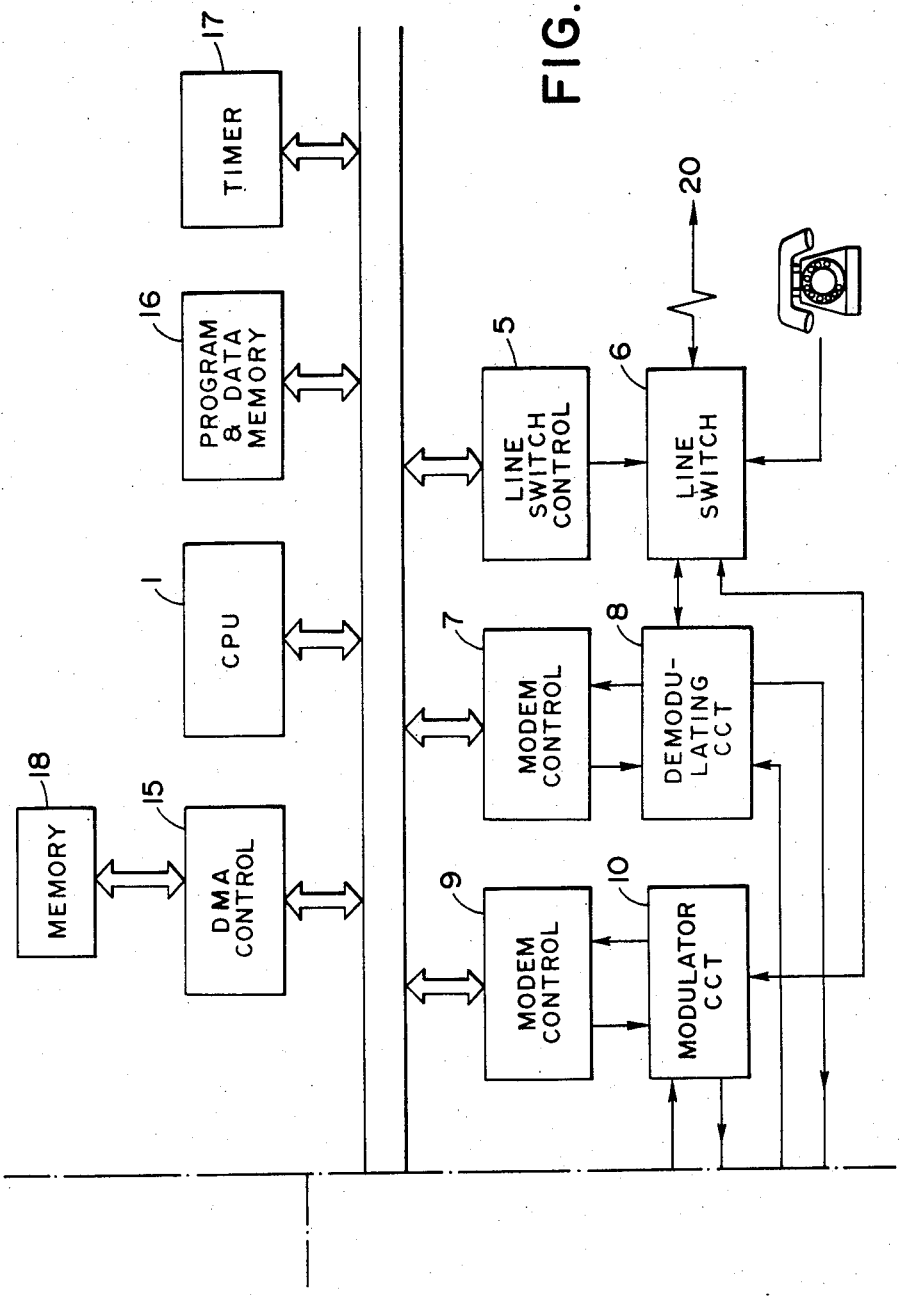

FIGS. 7A, 7B and 7C shows an example of the circuit structure for use in the apparatus shown in FIG. 6, wherein the control is principally achieved by a CPU 1.

In the stand-by state after the start of power supply, the CPU 1 monitors the state of the reader or optical system and the printer section through a reader input-/output control 2 and a printer input/output control 3, and, in case of an abnormality, provides an alarm to a display unit 22 through an operation/display control 4. Also the CPU receives the instructions from the operator through operations keys 21 and said operation/display control 4, and shows the results on said display unit 22 through said control 4. Furthermore it monitors the call signal of 16 Hz from the telephone line through a line switch 6 and a line switch control 5. In the operations of the apparatus, the processing of an abnormal state has the highest priority. For example in case the reader input/output control 2 identifies that the optical system is not in the home position thereof, priority is given to an operation of activating an optical system motor and a reverse clutch to return the optical system to said home position. Also in case the printer input-/output control 3 identifies the absence of copy sheet or toner and gives a corresponding display, priority is given to an operation of replenishment of toner or copy sheet by the operator. During said operation the instruction for copying or transmission by the operator through the operation keys 21 is not accepted, and the CPU 1 instructs the line switch control 5 to shift the line switch 6 to the telephone mode, thus forbidding the reception mode. The apparatus includes various operation modes such as copying mode, retention copying mode, transmission mode, reception mode, etc., and, once a mode is accepted, all other operation modes are forbidded until the completion of the already accepted mode.

As another application, in case of paper jamming or absence of copy sheet in the printer during the simultaneous reception and print-out of image information, the operation is not totally interrupted but the image information is received in continuation and is stored in the memory device although the function of the printer is interrupted. In such state the CPU 1 only gives a display for such paper jamming or absence of copy sheet on the display unit 22 and interrupts the function of the printer. This can be done by releasing a pulse from the CPU 1 and by providing a flip-flop in the operation/display control 4 for causing a display for paper jamming or absence of copy sheet and stopping the function of the printer 3. Consequently, the bus line commonly used for the transfer of image information and of operational instructions can be satisfactorily utilized for the reception of image information as it is only occupied by the CPU during the period of said pulse. In this manner the image information during reception is stored in the memory device 18 regardless of the state of the printer, and can later be supplied from said memory device for print-out by the printer after the failure thereof is resolved.

In the use as an off-line copier, in response to a copy instruction by the operator through the operation keys 21, the CPU 1 provides an instruction to the printer input/output control 3 to activate the motor, paper feed mechanism and high-voltage transformer and an instruction to the reader input/output control 2 to start the optical system motor. Then, when the leading end of the copy sheet passes through a registering sensor, the CPU 1 provides an instruction to the reader input/output control 2 to activate the forward clutch and the halogen lamp. When the optical system starts to move and passes through the original carriage front end sensor, the CPU 1 starts a photodiode control signal and instructs the printer input/output control 3 to activate the laser device. In response to a laser beam horizontal synchronization signal, the CPU 1 delivers the bus line to the DMA controls 13, 14. Thereafter the serial image signals supplied by the photodiode 41 are directly delivered through the DMA controls 14 and 13 to the laser device 19 for recording the image pattern on the copy sheet.

In the transmission mode, in response to a transmission signal given by the operator through the operation keys, the CPU 1 instructs the reader input/output control 2 to activate the optical system motor, halogen lamp and forward clutch. Then in response to a signal from the original front end sensor, the CPU 1 activates the photodiode array 41 and delivers the bus line to the DMA controls 14, 15 thereby recording the signals from the photodiode 41 into the memory device 18 by real-time serial transfer through said controls 14 and 15. Subsequently in response to the detection of the reversing point of the optical system the bus line is returned to CPU 1, which then instructs the reader input/output control 2 to deactivate the forward clutch, activate the backward clutch for returning the optical system to the home position and turning off all the controls. Then the response signal transmitter sends a machine mode signal and a phase signal to the receiving unit through the telephone line, and, upon detection of a reception standby signal by the response signal detector 12, the CPU 1 transmits the information of N lines stored in the memory device 18 through the MODEM control 9, modulating circuit 10 and line switch 6. After the completion of transmission of said information, the response signal transmitter 11 sends a message end signal to the receiving unit, and, upon detection of a message confirmation signal by the response signal detector 12, the CPU 1 displays an end message on the display unit 22 and activates a timer 17. After the lapse of a determined time, the CPU 1 instructs the line switch control 5 to disconnect the line, thus completing the operation in the transmission mode.

The function in the reception mode is the same as in the application as a receiver in the information transmission apparatus.

The retention mode is utilized for releasing the information previously stored in the memory device 18. Upon detection, through the operation/display control 4, of actuation of a retention key in the control panel by the operator, the CPU 1 instructs the printer input/output control 3 to activate the motor, paper feed solenoid, high-voltage transformer, blower, etc., the CPU 1 then activates the laser device upon detection of a copy sheet by the registering sensor and, in response to the laser beam horizontal synchronization signal, releases the bus line thereby transmitting the information from the memory device 18 to the laser device through the DMA controls 15 and 13. In this manner an image pattern is formed on the copy sheet (cf. flow charts in FIGS. 20–23).

Also the presence of the aforementioned memory device 18 permits transmission of the information therein, obtained by scanning of an original or received otherwise, during an arbitrary unoccupied time of the telephone line, and to receive the information at any unoccupied time of the telephone line independent from the function of the printer. Furthermore, said memory device 18 can be a multi-sectioned memory capable of storing a determined number of image information in different memory addresses. In such case it is rendered possible to simultaneously transmit, receive or print plural information.

As another embodiment, there will be explained an application of the present invention in the printer for an intelligent terminal having a cathode ray tube display.

Figure 8:
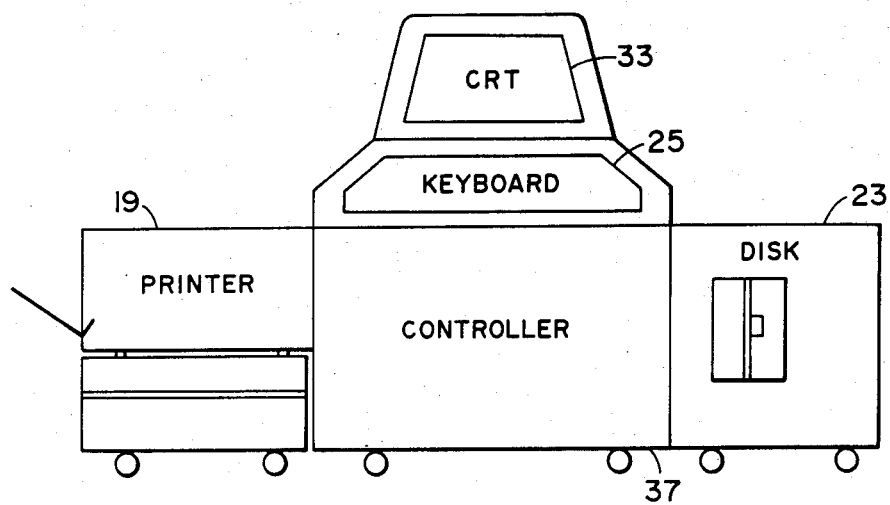
FIGS. 8, 10, 12, 14 and 16 are schematic views showing examples of applications of the present invention.

An intelligent terminal indicates an automatic retrieval device, calculator, office computer, word processor, etc., and has a general structure as shown in FIG. 8, wherein the information/data processing is achieved by dialogue with the operator through a cathode ray tube 33 and a keyboard 25. Such a terminal is also capable of storing information/data into a disk 23 or retrieving information therefrom. When desired information/data are displayed on said cathode ray tube 33, the operator causes, by an instruction through the keyboard 25, the printer 19 to print said information/data.

Figure 9A:
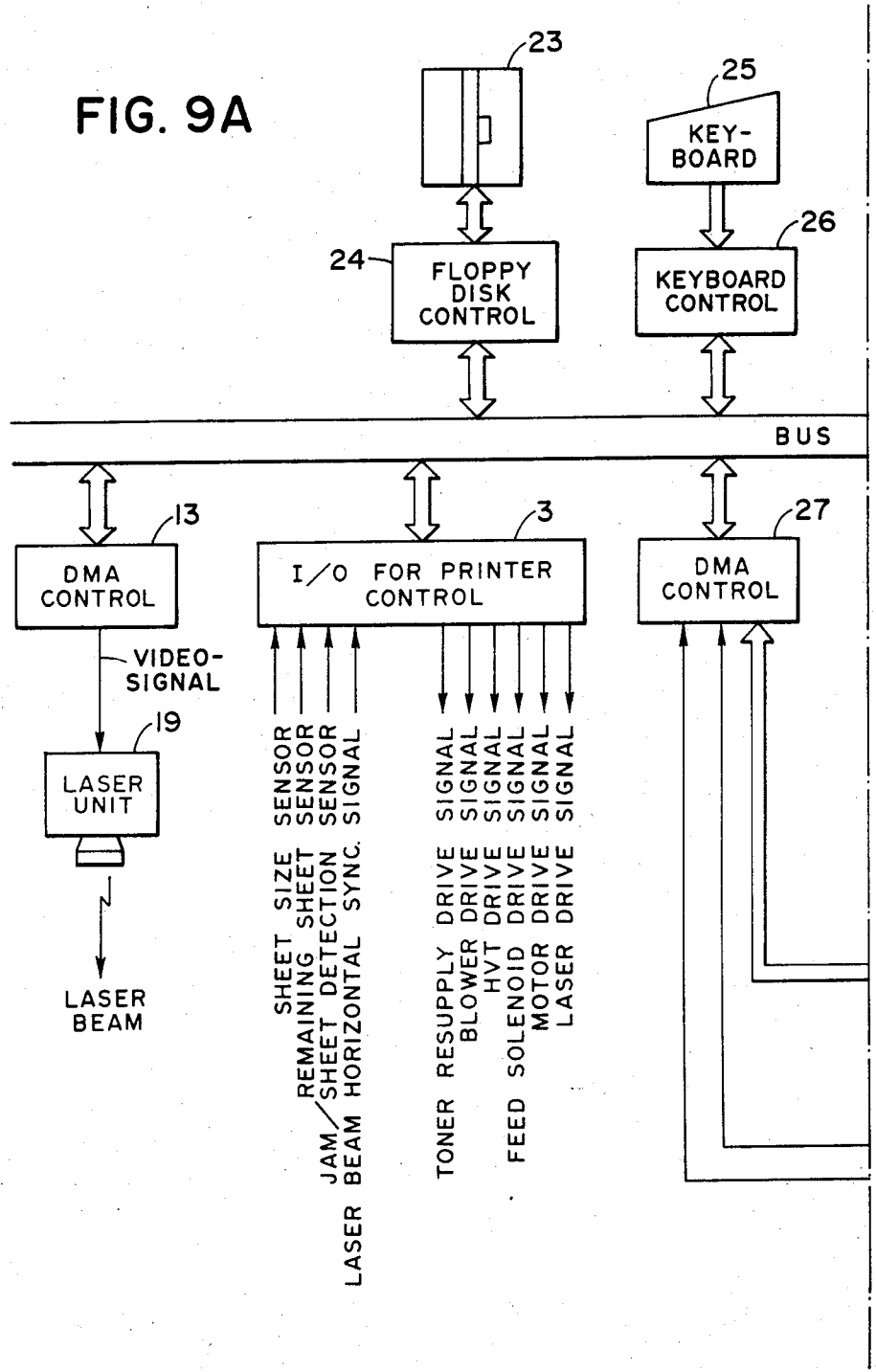
FIGS. 9A and 9B are block diagrams showing the function of the examples and the structure of the control device.
Figure 9B:
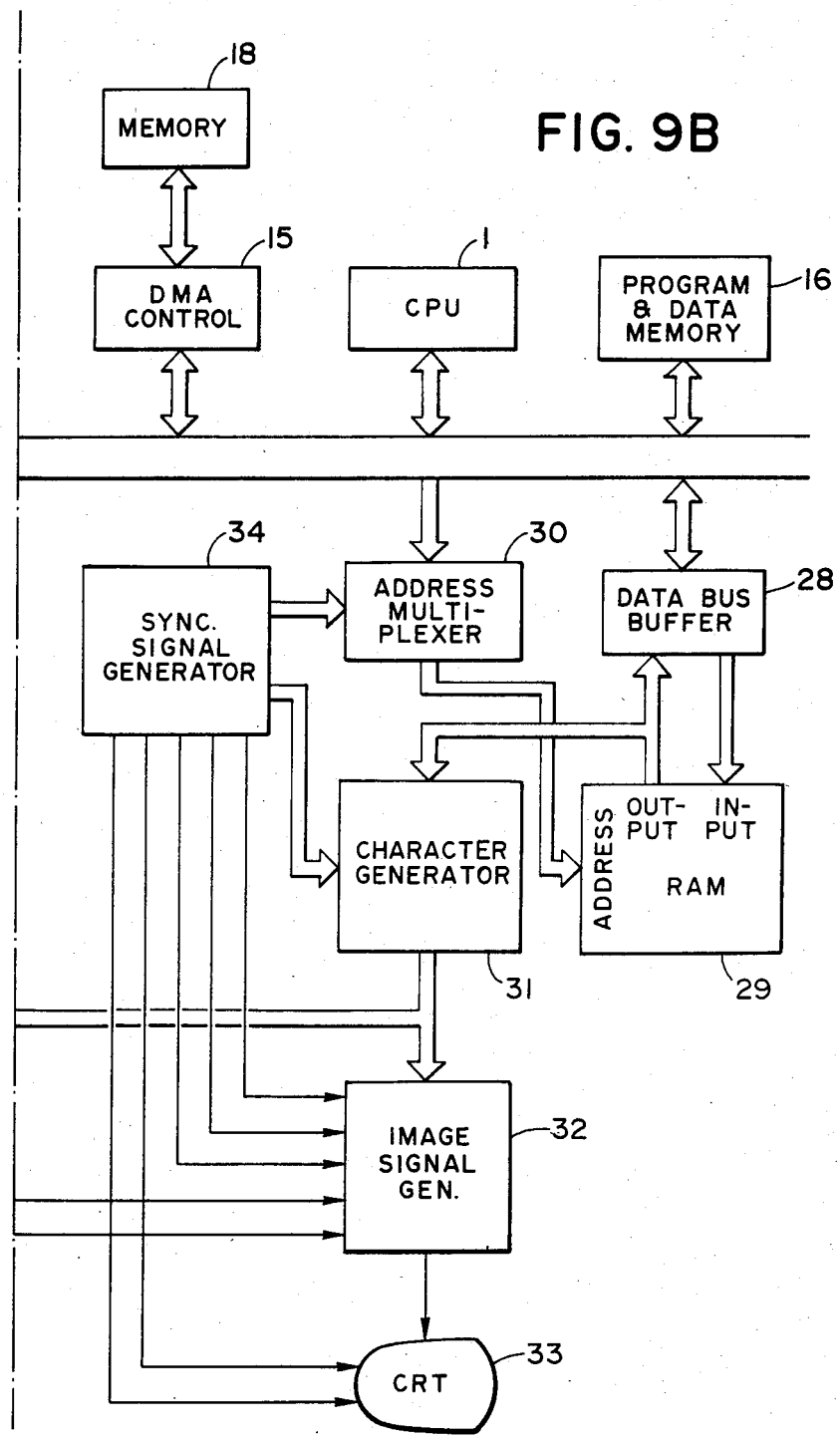

FIGS. 9A and 9B shows an example of the circuit of such a terminal, wherein the entire control is achieved by a CPU 1. A cathode ray tube 33 is capable of displaying characters in 32 lines and 32 columns, each character being composed by $5 \times 7$ dots.

The information of $32 \times 32$ characters to be displayed on the entire face of the cathode ray tube 33 is stored statically in a random access memory or RAM 29. A synchronziation signal generator 34 generates timing signals for achieving display on the cathode ray tube 33. A multiplexer 30 normally selects the signals not from the bus line but from said generator 34. The contents of said RAM 29 are read in succession by the address signals from the synchronization signal generator 34 and are supplied to a character generator 31, which also receives a column selection signal from said synchronization signal generator 34 to release bit patterns corresponding to each column to the image signal generator 32. Since each character pattern is composed of $5 \times 7$ dots, the character data at an address of the RAM 29 are called seven times to the character generator 31, which thus provides 5-bit parallel signals. Said image signal generator 32 converts said 5-bit parallel signals into serial signals which are supplied as the video signals to the cathode ray tube 33.

The key control is conducted in the following manner. Upon detection of a key signal from the keyboard 25 through a keyboard control 26, the CPU 1 stores a corresponding code in a buffer 28, and, upon detection of a terminate key signal for a character string, the CPU 1 decodes the command signal, processes the information or data accordingly and writes the result thereof in the RAM 29 for display through a data bus buffer 28. The key signal codes entered in the buffer 28 are naturally supplied in succession to the RAM 29 and displayed.

In case of displaying a file on the floppy disk 23 by an instruction from the keyboard 25, the information stored in said disk 23 is stored into the RAM 29 through a floppy disk control 24 and data bus buffer 28. Also in case of recording the information on the cathode ray tube 33, said information is written into the disk 23 through the RAM 29, data bus buffer 28 and floppy disk control 24.

Figure 24:
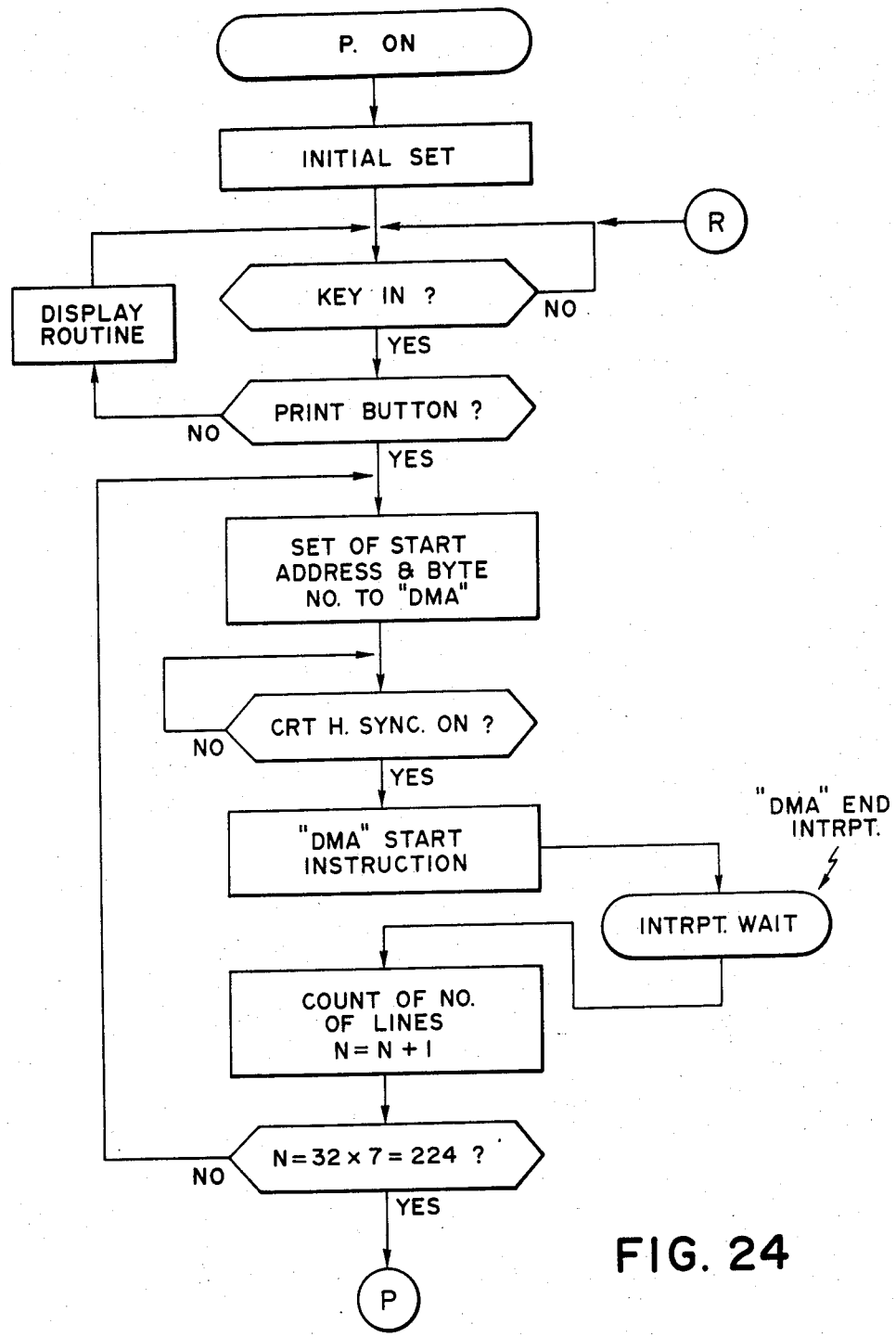
FIG. 24 is flow chart showing the control function by the control device of the present invention.
Figure 25A:
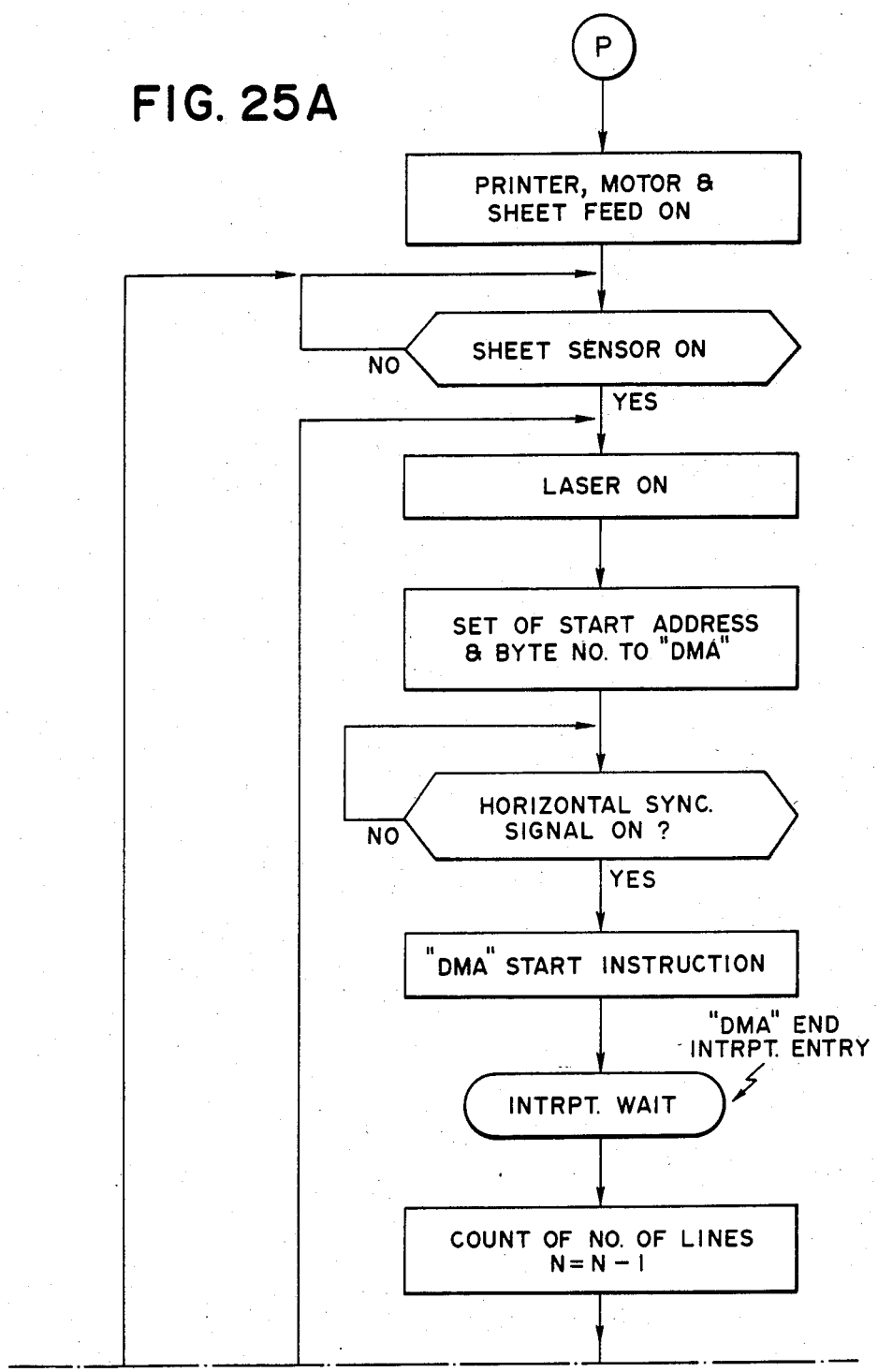
FIGS. 25A and 25B are flow charts showing the control function by the control device of the present invention.
Figure 25B:
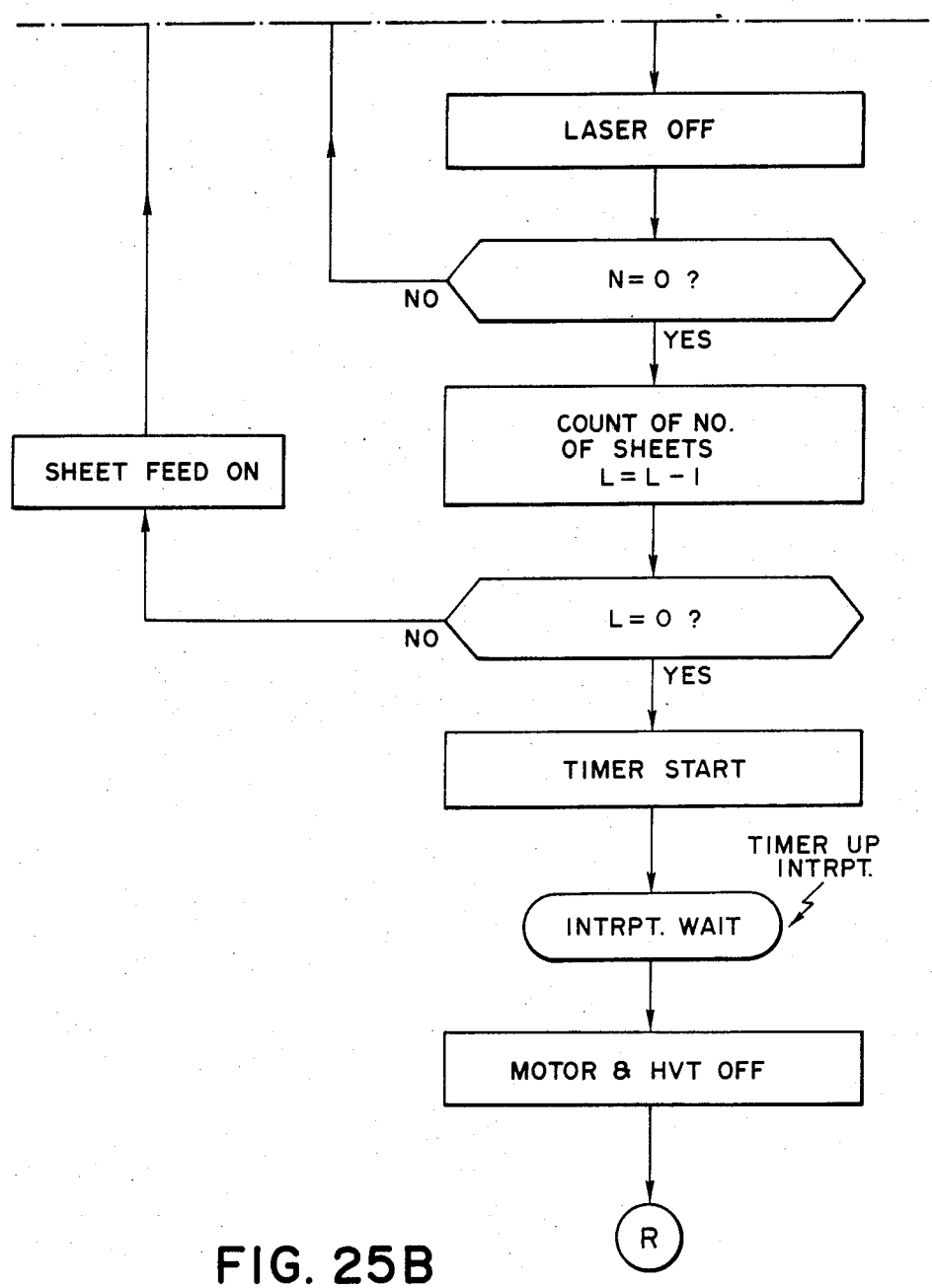

In case of printing the information or data displayed on the cathode ray tube 33, said information or data are once transferred to a high-speed memory since the scanning speed of the cathode ray tube 33 is only of the order of 100 Hz whereas the recording speed of the printer is of the order of 100 KHz. This can be done by recording the parallel data from the character generator 31 into the memory device 18 through DMA controls 13 and 15, in synchronization with the horizontal/vertical timing signals for the cathode ray tube 33. After the completion of said recording, the CPU 1 instructs the printer input/output control 3 to activate the printer and causes the memory device 18 to release the information to the laser device 19 through the DMA controls 15, 13 in synchronization with the advancement of the copy sheet. The function thereafter is similar to that in the foregoing retention mode and will not therefore be explained in detail (cf. flow charts in FIGS. 24 and 25).

Figure 11:
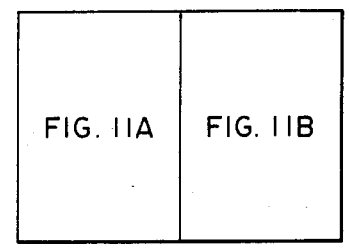
FIG. 11 illustrates a connecting relationship between FIGS. 11A and 11B.
Figure 13:
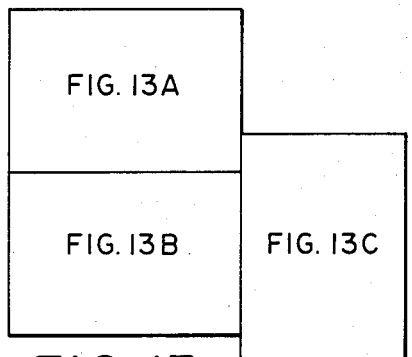
FIG. 13 illustrates a connecting relationship among FIGS. 13A, 13B and 13C.
Figure 15:
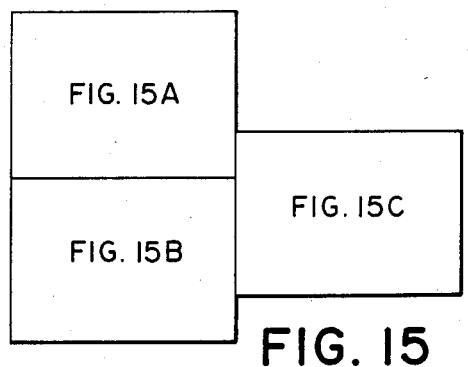
FIG. 15 illustrates a connecting relationship among FIGS. 15A, 15B and 15C.
Figure 10:
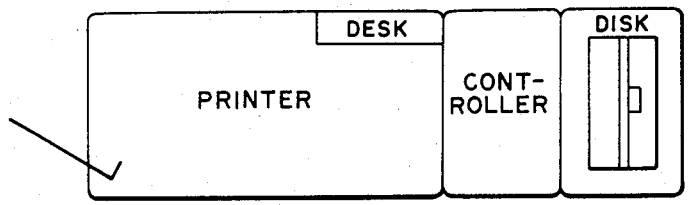
Figure 11B:
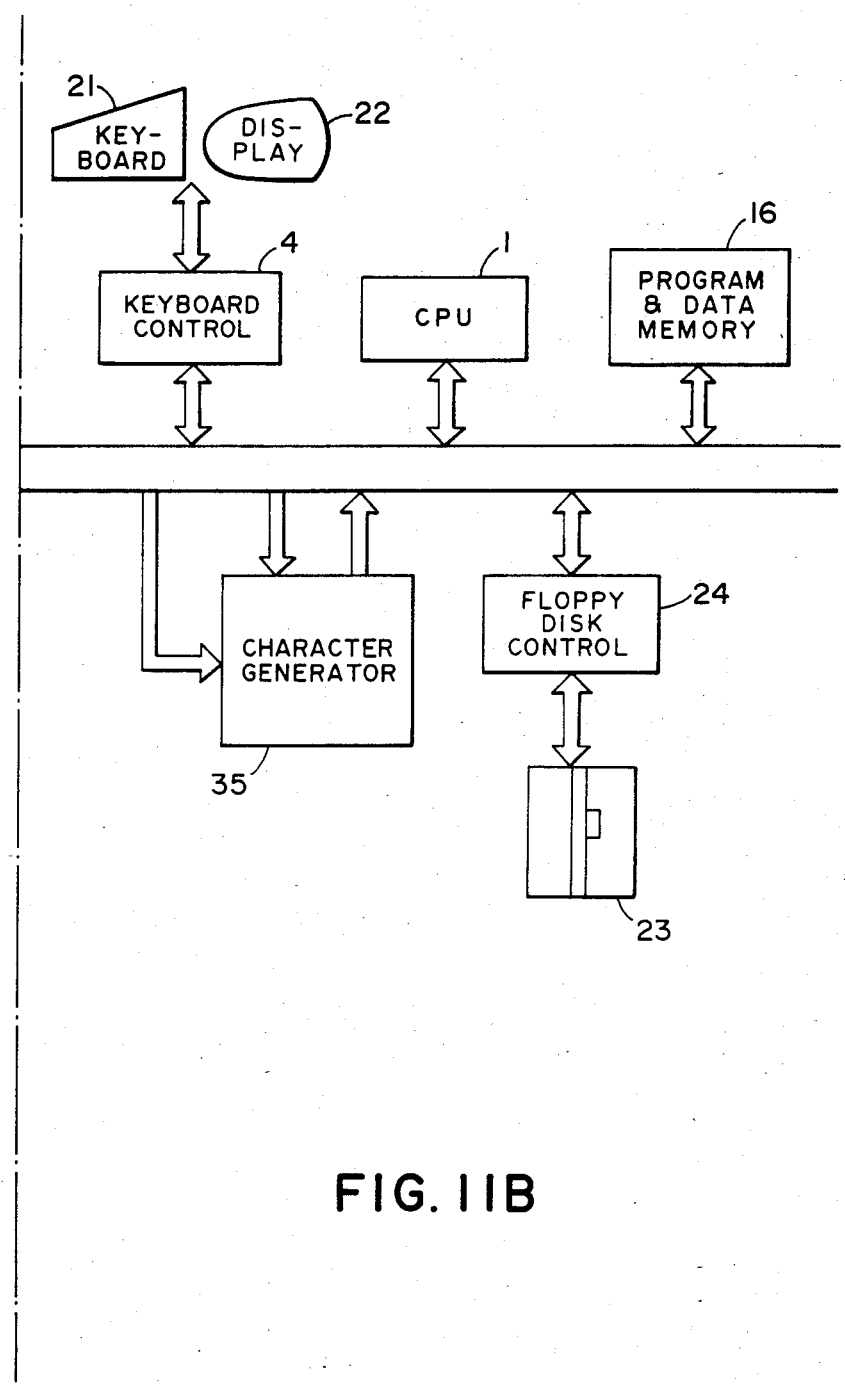

Now, as another embodiment there will be explained an information retrieving apparatus shown in FIG. 10, for retrieving and printing information files prepared in an office computer, computer, word processor, etc., and stored in a magnetic card or a magnetic disk. FIGS. 11A and 11B shows an example of the circuit therefor in which, in response to the file name to be printed and the corresponding code entered by the operator from the keyboard 21, the CPU 1 instructs a floppy disk control 24 to retrieve a corresponding file name, transfers the desired content from a floppy disk 23 to the data memory 16 when said file is retrieved, then converts the data on said data memory 16 into pixel information through the character generator 35 and stores the characters decomposed into bit patterns through the DMA control 15 to the memory device 18. After said storage, the CPU 1 instructs the printer input/output control 3 to initiate the copying operation, turning on the laser, and, upon detection of the laser beam horizontal synchronization signal, releases the bus line to transfer the data from the memory device 18 to the laser device 19 through the DMA controls 15 and 13. The function thereafter is the same as in the foregoing retention mode and will not therefore be explained in detail.

Now there will be explained an apparatus called graphic processor as another embodiment of the present invention.

Information can be classified into two categories; image that can be understood by human being, and data that can be understood by computer. Such information are associated with communication and processing. In the field of image communication there is already known facsimile, in the field of data communication there exists word processor, and computer is utilized in the data processing field. Then, in the field of image processing the present invention proposes an apparatus called graphic processor, which performs the superposing, synthesizing, trimming, enlarging, reducing, changing position, etc., of an image. As will be clarified from the following description, said apparatus, in addition to the above-mentioned functions achieved by a computer, is provided with a keyboard and a cathode ray tube display for dialogue with the opeartor and can be expanded to incorporate floppy disk device or the like for information storage or filing, so that there will be provided a novel information processing apparatus covering the entire field of communication and processing of image and data.

Figure 12:
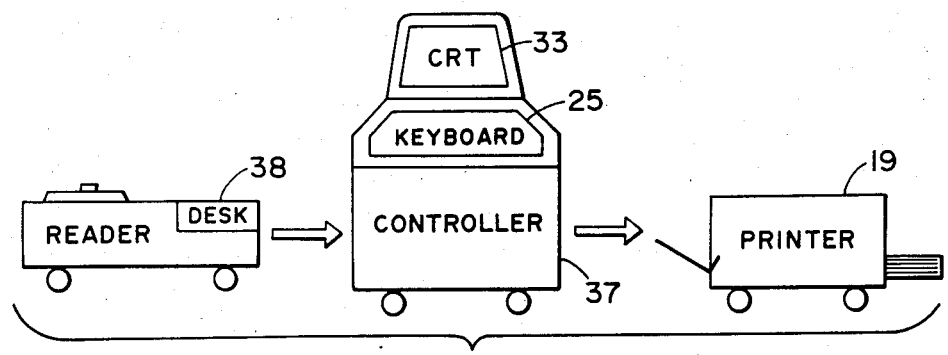
Figure 13A:
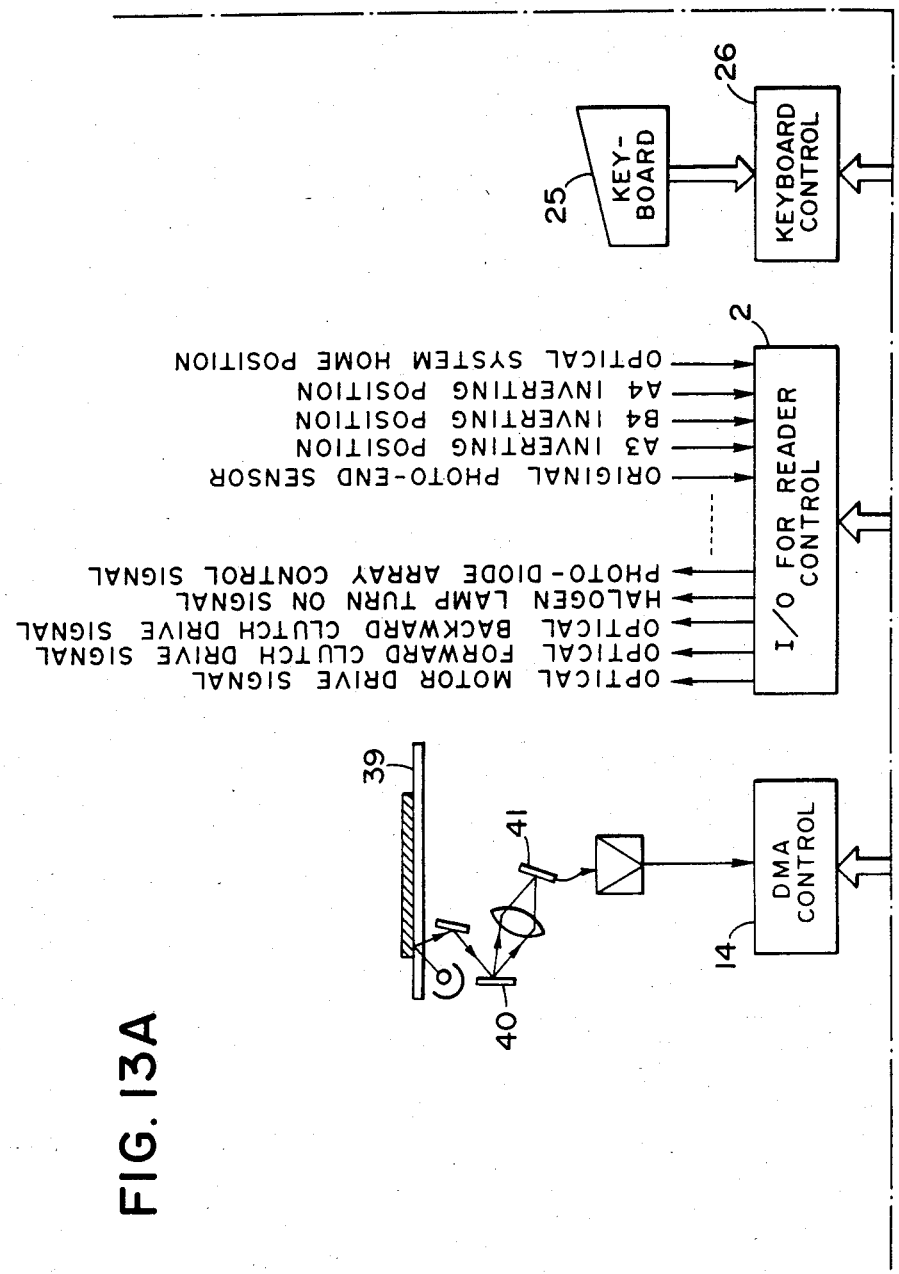
FIGS. 13A, 13B and 13C are block diagrams showing the function of the examples and the structure of the control device.
Figure 13B:
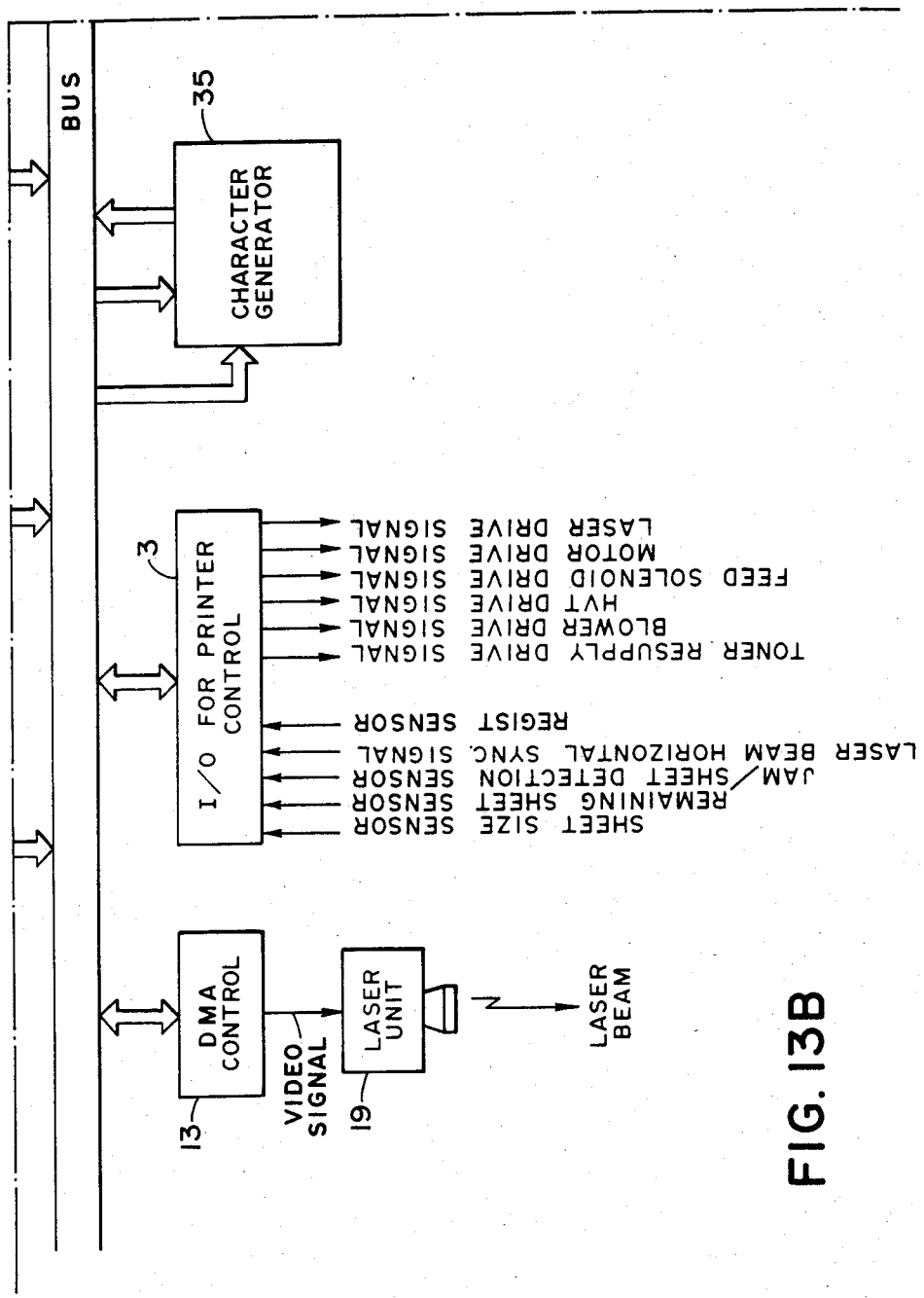
Figure 13C:
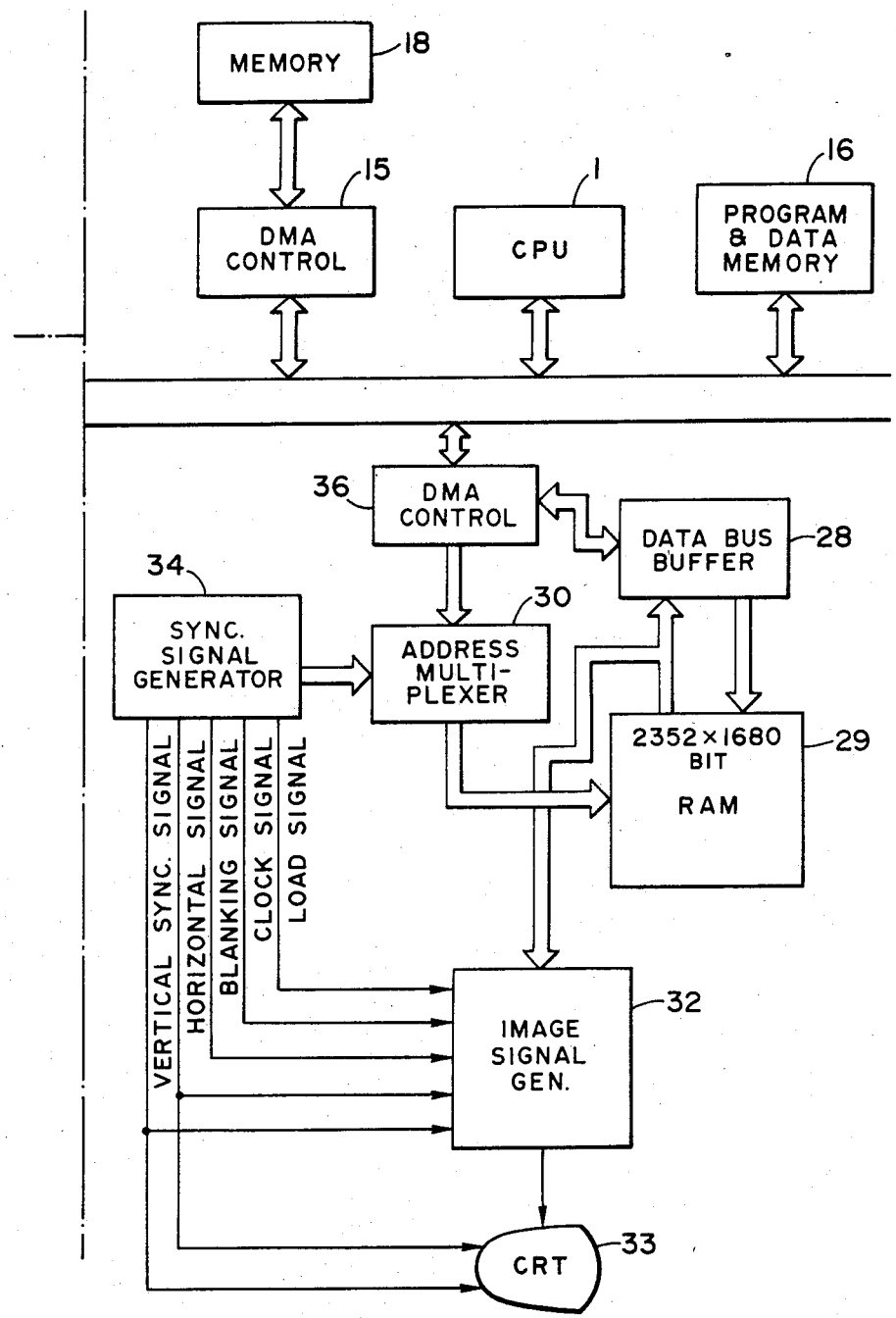

FIG. 12 illustrates the structure of said apparatus, wherein there are shown a reader unit 38 for reading an original placed thereon; a controller unit 37 for controlling the entire apparatus; a cathode ray tube 33 for displaying the image read by said reader unit 38; a keyboard 25 by which the operator instructs the superposing, synthesizing, trimming, enlarging, reducing, shifting or copying of the image displayed on the cathode ray tube 33; and a printer unit 19 for printing the image displayed on the cathode ray tube 33. The present embodiment is limited to an original size of A4, which is divided into pixels with a resolving power of 8 bits/mm. Thus an original of A4 size is divided in lateral direction into 210 mm×8 bits/mm=1680 bits and in vertical direction into 294 mm×8 bits/mm=2352 bits, so that the screen of said cathode ray tube is also divided into 1680 dots in the lateral direction and 2352 dots in the vertical direction. Correspondingly the video-RAM for storing the information is of a dimension of 1680×2352 bits. An example of the circuit for use in the present embodiment is shown in FIGS. 13A, 13B and 13C.

In response to a read instruction from the keyboard 25, the CPU 1 instructs a reader input/output control 2 to activate the optical system motor, halogen lamp and forward clutch. When the optical system is set into motion and is detected by the original front end sensor, the CPU 1 activates the photodiode array 41 and releases the bus line, thus permitting transfer of the signals between the DMA controls 14 and 15. The image signals obtained from the photodiode array 41 are stored, through an image amplifier, in the memory device 18. The scanning speed of the optical system 40 is same as in the foregoing embodiments, thus achieving a very high transfer speed. When the optical system 40 reaches the reversing point after reading the original of A4 size, the CPU 1 turns off the halogen lamp and forward clutch and activates the backward clutch. Then, upon arrival of the optical system at the home position, the CPU 1 instructs the reader input/output control 2 to stop the function of the entire apparatus.

In order to display the image signals stored in the memory device 18 on the cathode ray tube 33, said signals have to be transferred at high-speed on the video-RAM 29. For this purpose the CPU 1 again releases the bus line to allow the data transfer between the DMA controls 15 and 36, according to an instruction from the keyboard 25 or to a program stored in the program memory 16. In this manner the information of 1 page or 1680×2352 bits in the memory device 18 is transferred through the DMA controls 15, 36 and the data bus buffer 28 to the video-RAM 29. In this state the address multiplexer 30 selects the address of the DMA control 36 to designate the RAM 29. The signals transferred into the RAM 29 are transferred, independently from the function of CPU 1 and in synchronization with the timing signals generated by the synchronization signal generator 34, to the image signal generator 32 thereby generating serial video signals for display on the cathode ray tube 33. The memory device 18 functioning as a buffer memory has a capacity of storing information of at least one page (1680×2352×n pages).

In the present embodiment the program memory 16 is provided with a group of commands for image processing such as superposing, synthesizing, trimming, enlarging, reducing, shifting or copying. As an example, in case of inserting alphanumeric information instructed by the operator into a part of an image pattern, a key code entered from the keyboard 25 is stored in the program/data memory 16 through the keyboard control 26, the CPU 1 decodes said key code for example as a synthesize-trim command. In such a case the ensuing alphanumeric characters are identified as information to be inserted and are in succession supplied to the character generator 35 for conversion into bit patterns. Then the CPU 1 designates the address in the memory device 18 and transfers said bit patterns to said address, thus completing the operation of said command. Thereafter the CPU 1 transfers the content of the memory device 18 to the RAM 29 in the aforementioned manner for confirmation of the result on the cathode ray tube 33 by the operator.

Figure 26A:
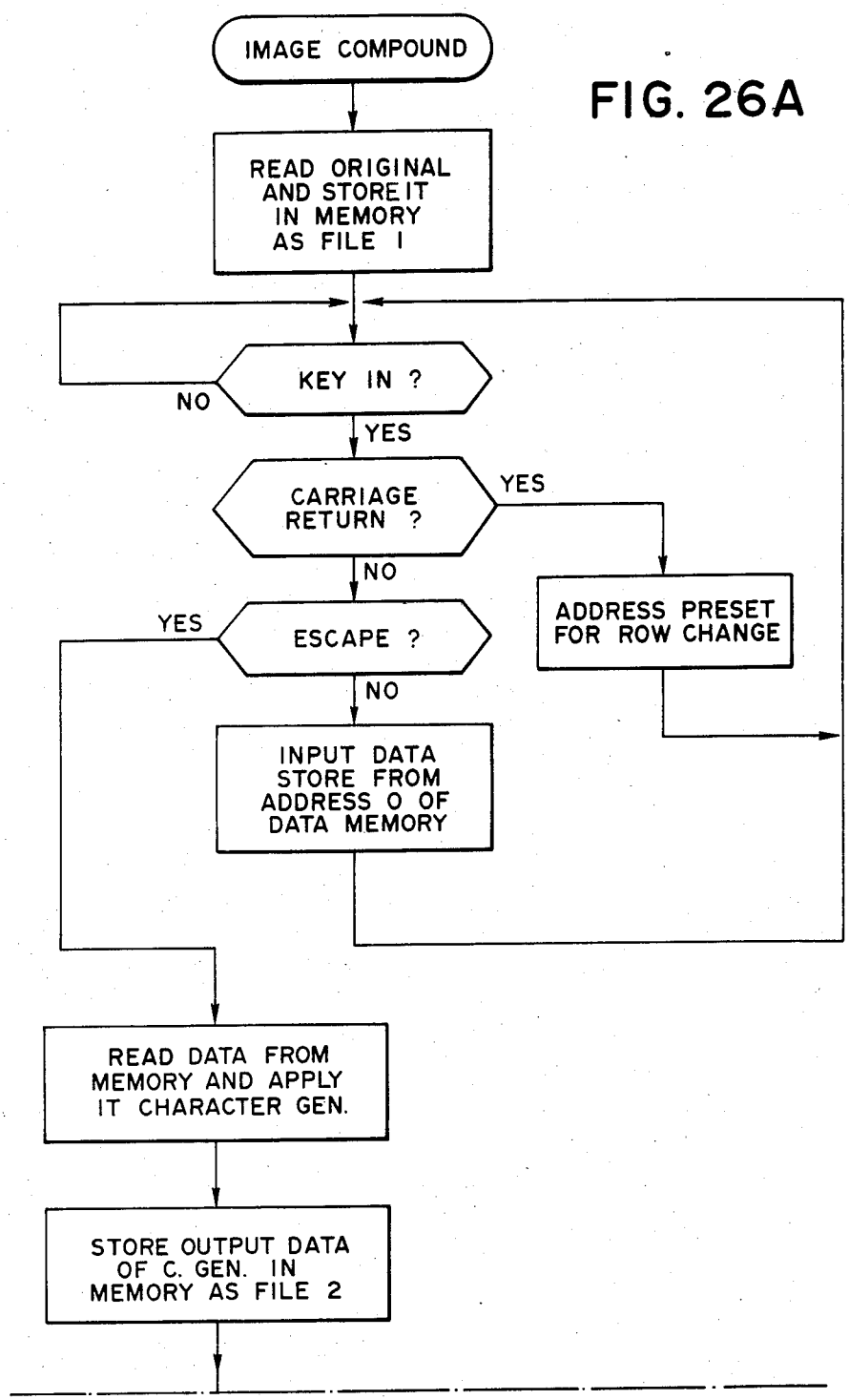
FIGS. 26A and 26B are flow charts showing the control function by the control device of the present invention.
Figure 26B:
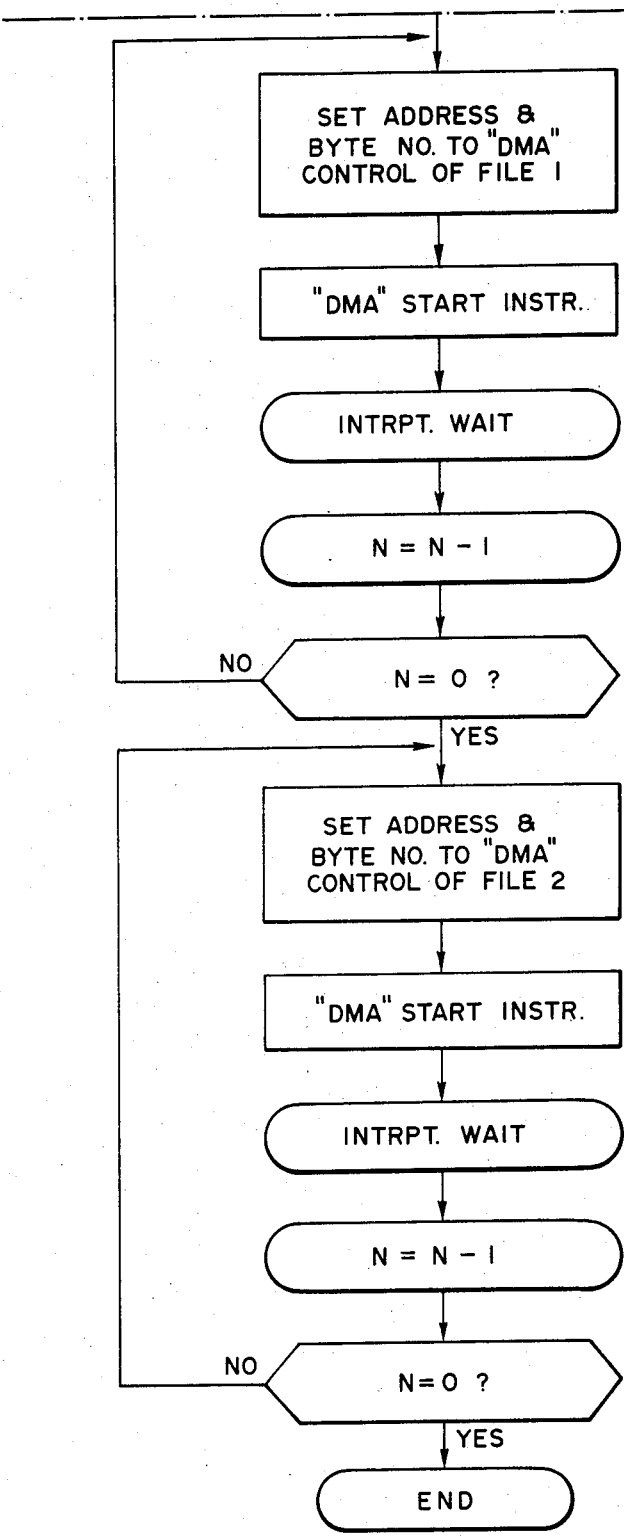

In this manner the image information obtained in the reader unit is stored, after photoelectric conversion, in a determined first section of the memory device 18, and then is supplied to the RAM 29 for display on the cathode ray tube 33. In said RAM 29 there is conducted image processing according to the image processing information such as synthesis or trimming, including the instruction for the position and size of trimming and synthesis, supplied in advance from the program/data memory 16 storing the control signals for image processing, in response to a key instruction or automatically by the CPU 1, and the processing image information is stored in a determined memory section of the memory device 18 and displayed on the cathode ray tube 33. Subsequently the information to be synthesized with thus synthesized image and an instruction for synthesis are entered from the keyboard 25. Said information from the keyboard 25 is stored in the data memory 16, then converted in the character generator 35 into image information for display on the cathode ray tube 33 and stored in a determined section in the memory device 18. Said information is further supplied to the RAM 29 in the similar manner as the information supplied from the reader unit, and is synthesized in a determined position according to a control signal supplied from the program/data memory 16 in the similar manner as the aforementioned image processing. The information thus synthesized is displayed on the cathode ray tube 33 for confirmation of the trimming and synthesis of the information from the reader unit and that entered from the keyboard. In this manner the memory device 18 stores the image information displayed on the cathode ray tube 33 after trimming and synthesis (cf. flow chart in FIG. 26).

In a following application for the processing such as synthesis, addition, correction, trimming, etc., of the image information from a communication line or a memory such as a floppy disk, the image processing can be achieved by the multi-sectioned memory 18 and by control signals in advance in the program memory 16 in the same manner as in the case of information obtained from the reader unit.

The position of synthesis can be modified by changing semi-fixed data concerning the location in the program memory 16 or by designating an approximate position by the keyboard 25.

Then in case of entry of copy command from the keyboard 25, the CPU 1 instructs the printer input/output control 3 to activate the motor, paper feed solenoid, high-voltage transformer, blower, etc., then activates the laser device in response to the detection of copy sheet by the registering sensor, and releases the bus line in response to the laser beam horizontal synchronization signal, thus permitting direct signal transfer between the DMA controls 15 and 13. In this manner the image information of one page stored in the memory device 18 is supplied to the printer at a high-speed synchronized with the processing speed of the copy sheet, thus completing the copying operation.

Figure 14:
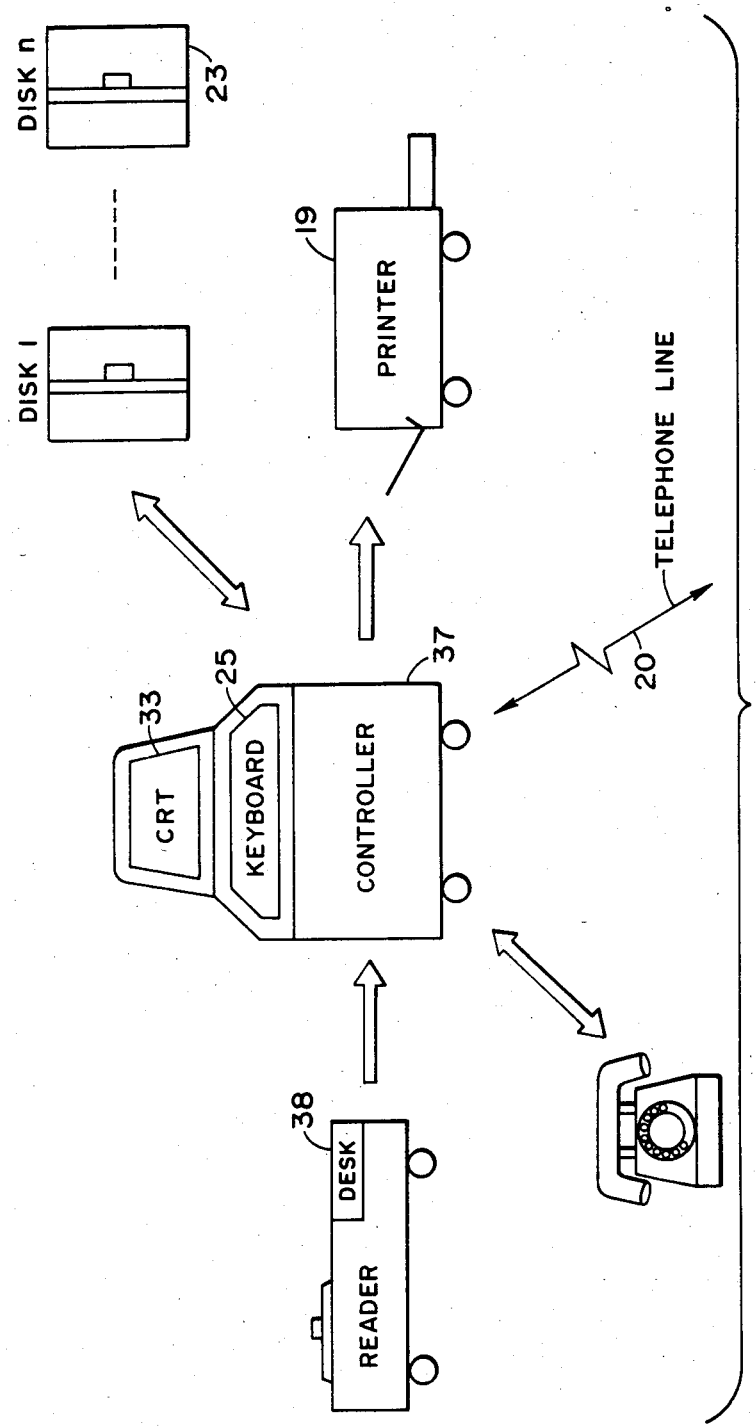

As another embodiment, FIG. 14 shows a graphic processor incorporating an information transmission apparatus and plural floppy disk devices in combination with the graphic processor shown in FIG. 12, for the purpose of processing, transmission, preparation, storage and retrieval of image and data.

The image copying is achieved by transmitting the image information obtained from the reader unit 38, telephone line 20 or disk 23 to the printer unit 19 through the controller 37. The image processing is achieved by displaying the information from the controller 37 on the cathode ray tube 33 and conducting correction, addition, trimming, synthesis, etc., according to the instruction from the keyboard 25. The image displayed on the tube 33 can be sent directly through the controller 37 to the printer 19 for print out. The image processing is achieved by dialogue with the operator through the keyboard 25 and the cathode ray tube 33. Also, if necessary, the information is transmitted to another apparatus through the telephone line 20 or stored in the disk 23. Stated differently, the output to the disk 23 represents the function of storage, and the input or output through the telephone line 20 represents the function of communication. Also the function of displaying a desired image on the cathode ray tube from the disk represents the retrieval.

It is furthermore possible to connect two or more readers or printers for input/output of image information of plural places.

Figure 15A:
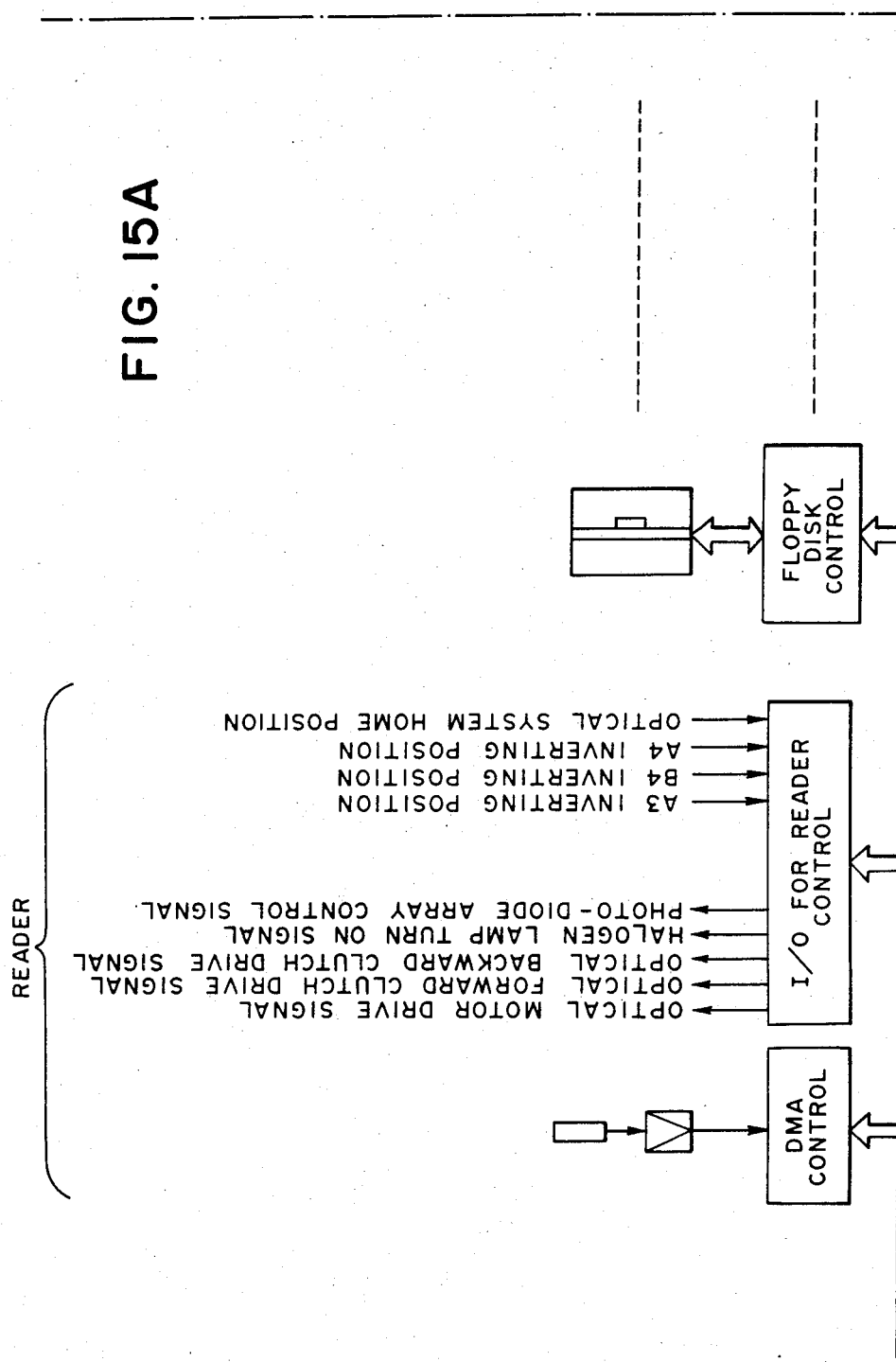
FIGS. 15A, 15B and 15C are block diagrams showing the function of the examples and the structure of the control device.
Figure 15B:
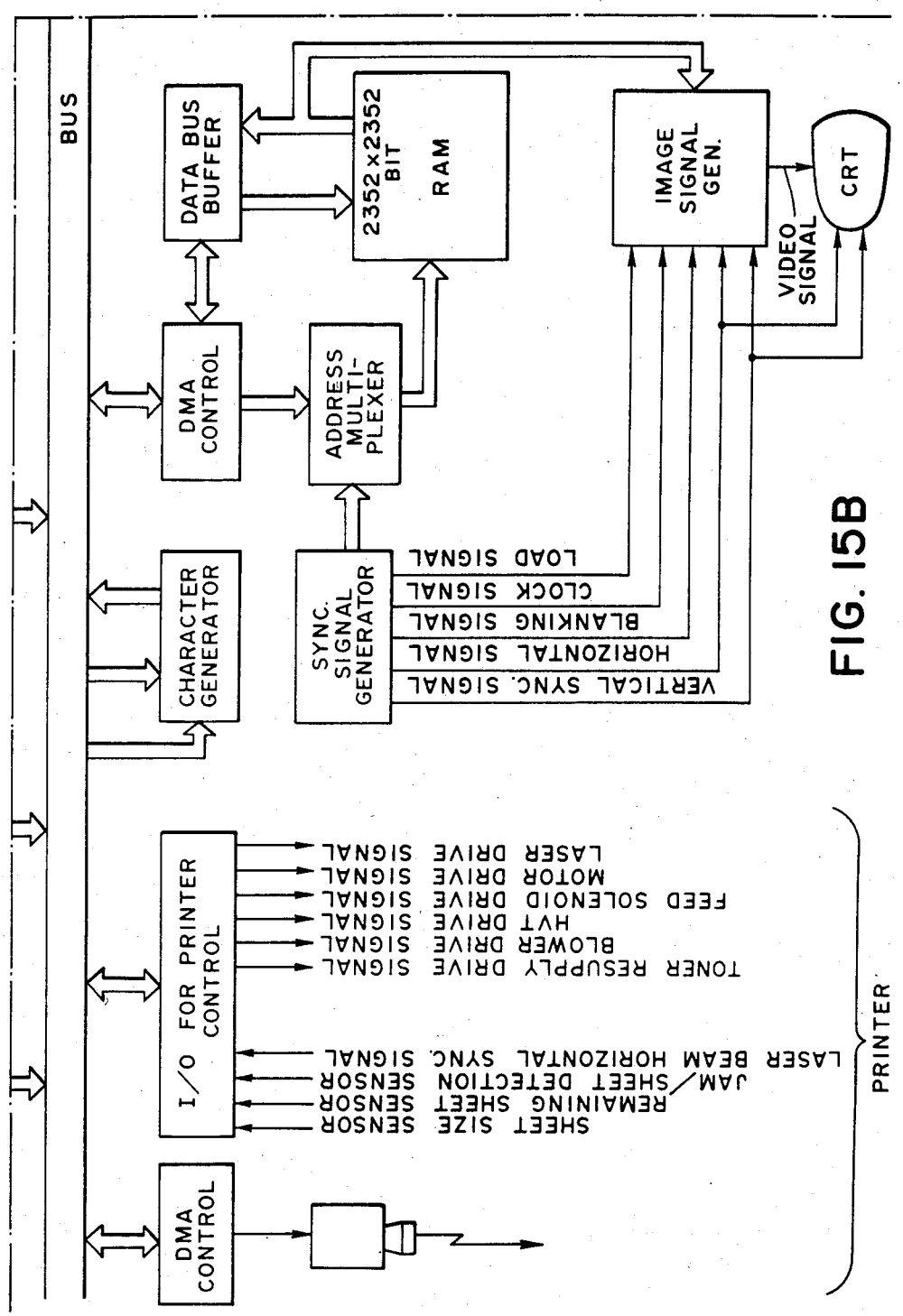
Figure 15C:
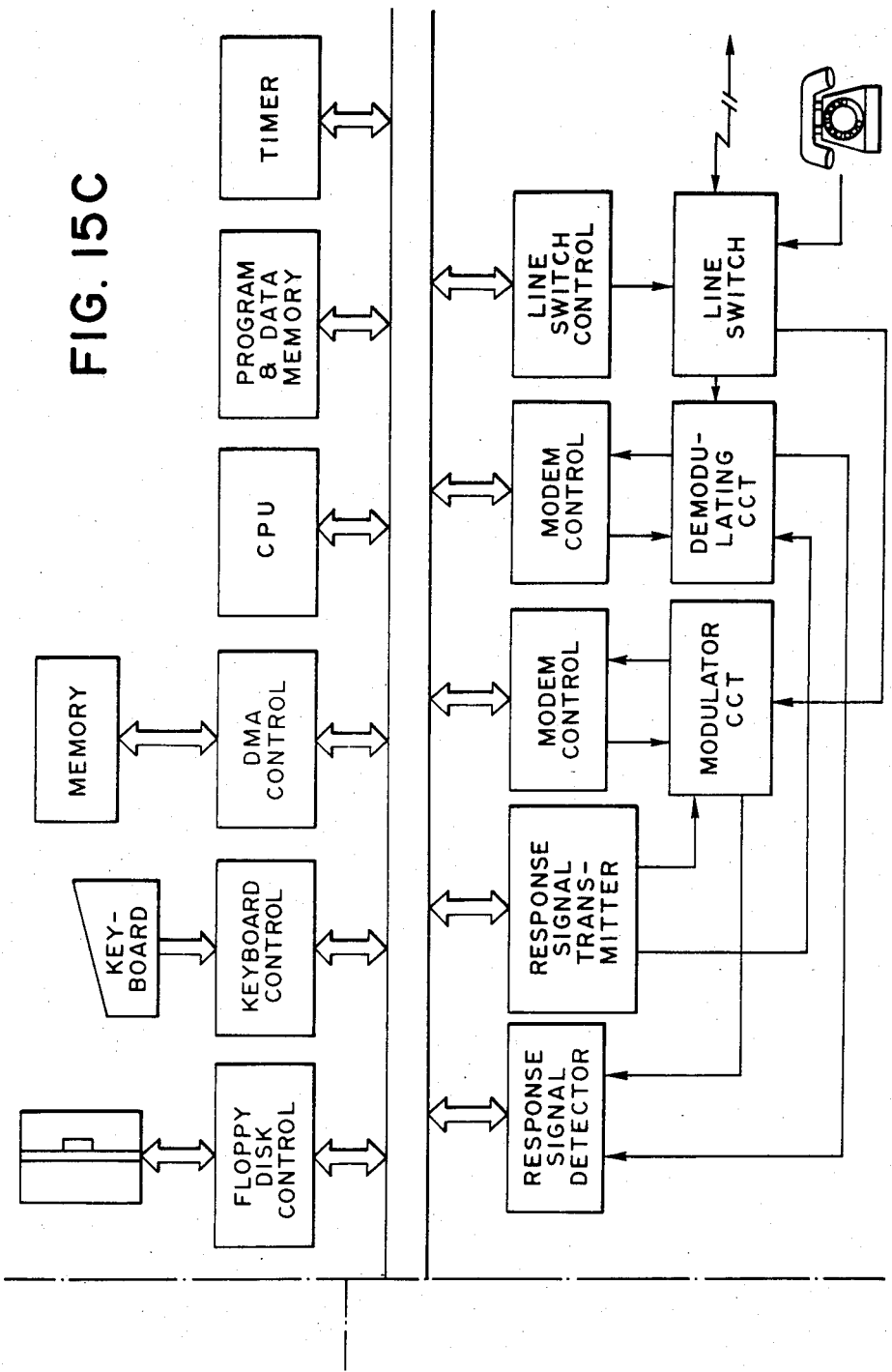

FIGS. 15A, 15B and 15C shows an example of the circuit for use in such a processor, which will not be explained in detail as said circuit is basically composed of a combination of the circuits shown in FIGS. 13A, 13B and 13C and FIGS. 7A, 7B, 7C.

Figure 16:
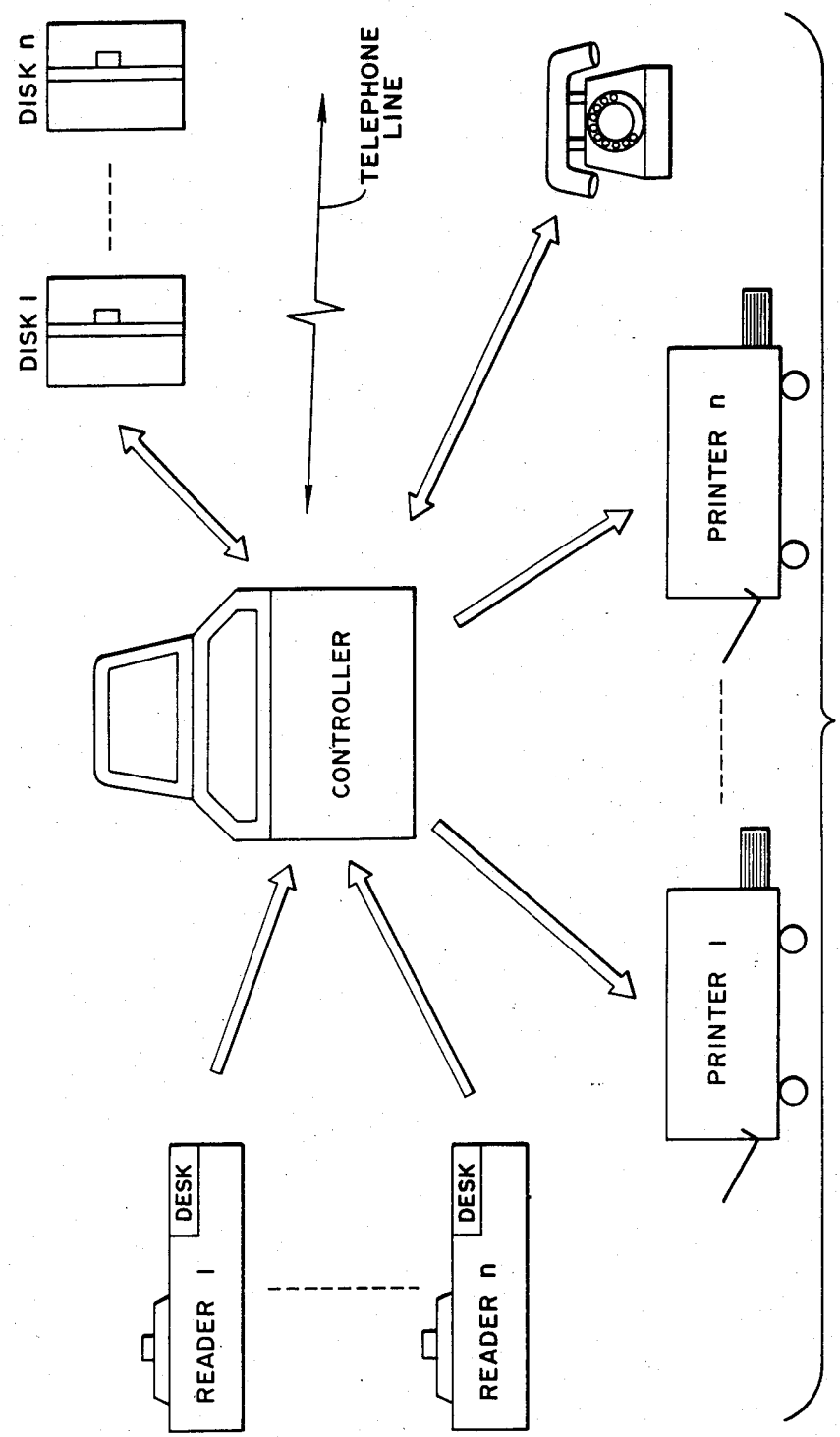

FIG. 16 shows a graphic processor provided with n readers, n printers, n disk devices and a communication apparatus. In such a structure, by placing the combination of a reader, a printer and a disk in different locations, it is rendered possible to display in any place the image obtained from the readers or stored in the disks, or to transfer the image information of the disk in any place, or to print the transferred image at a desired time. Furthermore the image transfer can be conducted from plural locations.

Also certain locations may not need a reader or printer. In such a case the above-mentioned combinations may be suitably modified to achieve more effective utilization of the apparatus.

Figure 17:
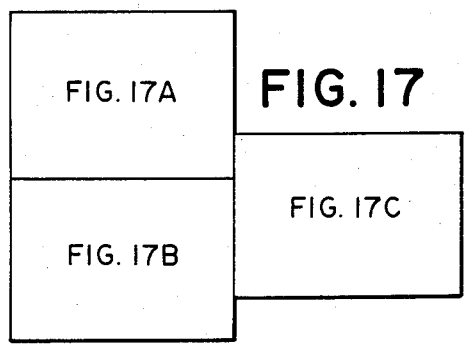
FIG. 17 illustrates a connecting relationship among FIGS. 17A, 17B and 17C.
Figure 17B:
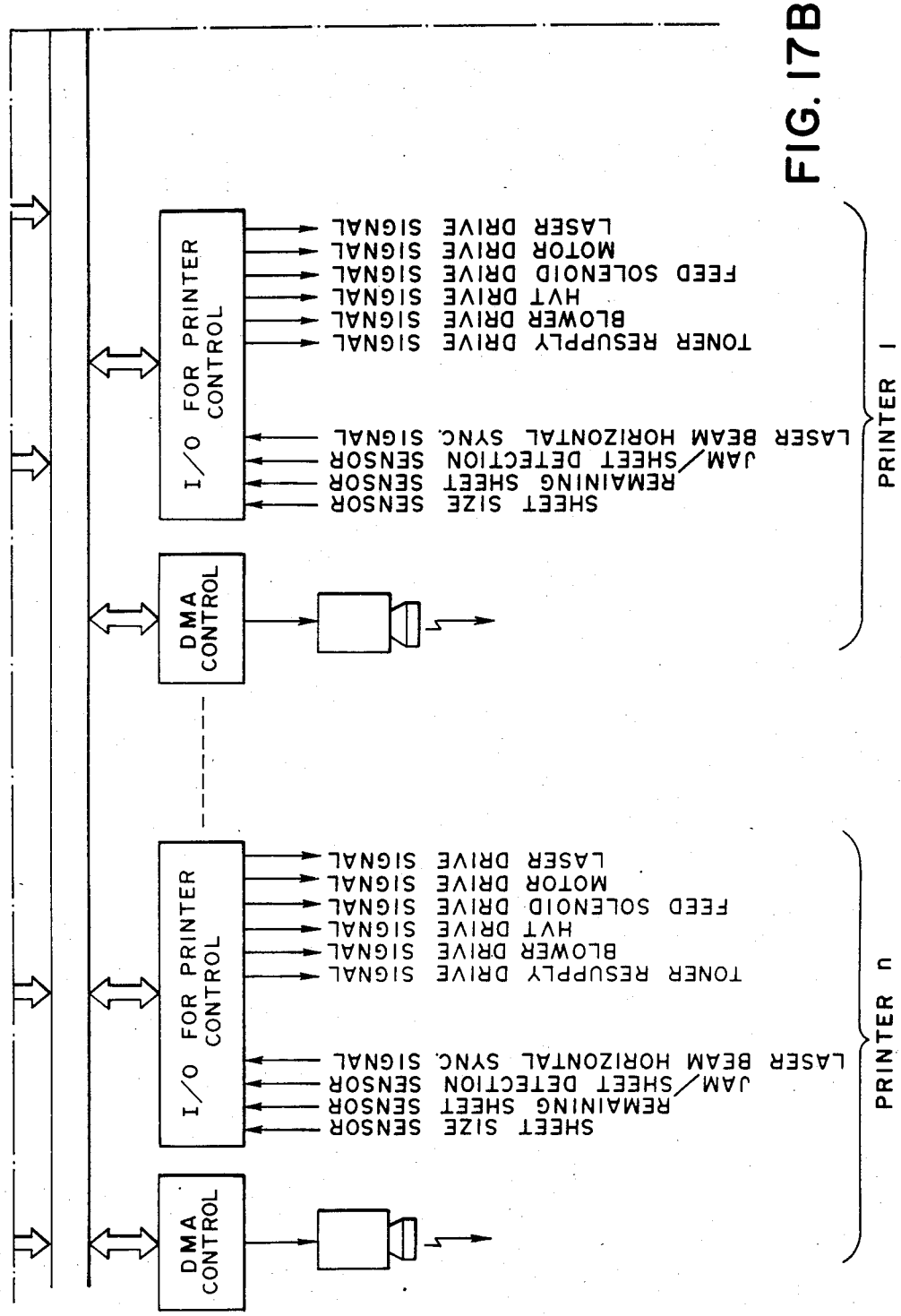
Figure 17C:
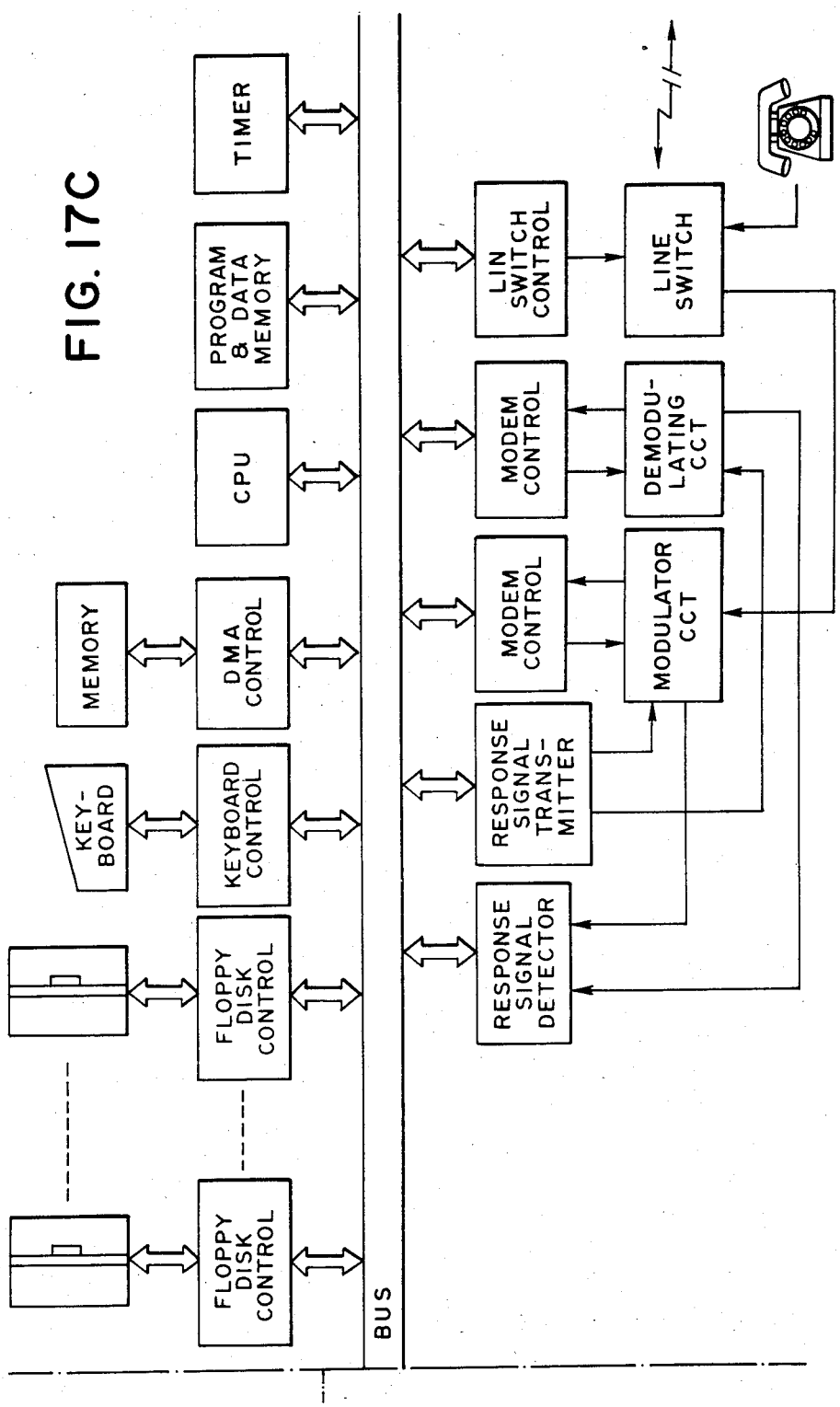

FIGS. 17A, 17B and 17C shows an example of the circuit for use in said graphic processor, which will not be explained in detail as said circuit is basically composed of addition of floppy disk devices to the circuit shown in FIGS. 7A, 7B and 7C.

What we claim is:

1. An image processing system, comprising:

means for reading an original image by photoelectric conversion and for generating original imaga data in bit image form;

means for entering character code data representing a character image;

means for converting the character code data entered by said entering means into character image data in bit image form;

first memory means for storing a page of image data in bit image form;

means for causing said first memory means to store the original image data and the character image data;

means for forming on a recording medium a reproduction image based on the image data read out from said first memory means, wherein in the reproduction image the character image has been inserted in the original image;

second memory means for storing bit image data corresponding to the image data stored in said first memory means; and means for displaying an image based on the bit image data stored in said second memory means.

2. A reproduction apparatus according to claim 1, wherein said entering means is a plurality of manually operable keys.

3. A system according to claim 1, further comprising means for storing the entered character code data representing plural characters, wherein said converting means converts the character code data sequentially read from said storing means into said character image data.

4. A system according to claim 1, wherein said causing means causes said first memory means to store original image data and character image data in respective specified areas thereof.

5. A system according to claim 4, wherein the specified areas in which original image data and character image data are to be stored are changeable.

6. An image processing system comprising:

means for reading an original image to generate original image data in bit form;

means for entering character code data corresponding to character image to be compounded with said original image;

means for converting the character code data entered from said entering means into character image data in bit form;

memory means for storing a page of image data in bit form;

means for causing said memory means to store the original image data from said reading means and the character image data from said converting means; and means for forming a composite image of the original image and the character image on a recording medium on a line by line basis in accordance with the image data stored in said memory means.

wherein said memory means supplies the image data to said forming means in response to a line synchronizing signal of the image forming operation of said forming means.

7. A system according to claim 6, wherein said entering means includes manually operable keys for character input.

8. A system according to claim 6, wherein said forming means is a printer for forming a bit image on a photosensitive member by a laser beam.

9. A system according to claim 6, wherein said causing means causes said memory means to store original image data and character image data in respective specified areas thereof.

10. A system according to claim 9, wherein the specified areas in which original image data and character image data are to be stored are changeable.

* * * * *